(12) United States Patent
Tucker

(10) Patent No.: US 8,274,178 B2
(45) Date of Patent: Sep. 25, 2012

(54) SYSTEM OF TRANSMISSION OF WIRELESS ENERGY

(75) Inventor: Christopher Allen Tucker, Prague (CS)

(73) Assignee: Christopher Allen Tucker, Prague (CS)

( * ) Notice: Subject to any disclaimer, the term of this patent is extended or adjusted under 35 U.S.C. 154(b) by 239 days.

(21) Appl. No.: 12/794,724

(22) Filed: Jun. 5, 2010

(65) Prior Publication Data

US 2010/0264748 A1 Oct. 21, 2010

(51) Int. Cl.
*H01F 27/42* (2006.01)
*H01F 37/00* (2006.01)
*H01F 38/00* (2006.01)

(52) U.S. Cl. .... 307/104; 336/146; 455/41.1; 455/191.1; 455/193.2; 455/269; 455/292

(58) Field of Classification Search ........................ None
See application file for complete search history.

(56) References Cited

U.S. PATENT DOCUMENTS 7,675,197 B2 * 3/2010 Tetlow ........................ 307/104
2011/0165837 A1 * 7/2011 Issa et al. ..................... 455/41.1
* cited by examiner

*Primary Examiner* — Rexford Barnie
*Assistant Examiner* — Justen Fauth

(57) ABSTRACT

A resonant array for the transmission of multiple frequency wireless energy in multiple configurations at a useful distance for grid-coordinate power and information delivery on small aperture and mobile scales where alternatives such as battery, solar, infrared, microwave, or other power-independent means are inappropriate or inaccessible.

26 Claims, 23 Drawing Sheets

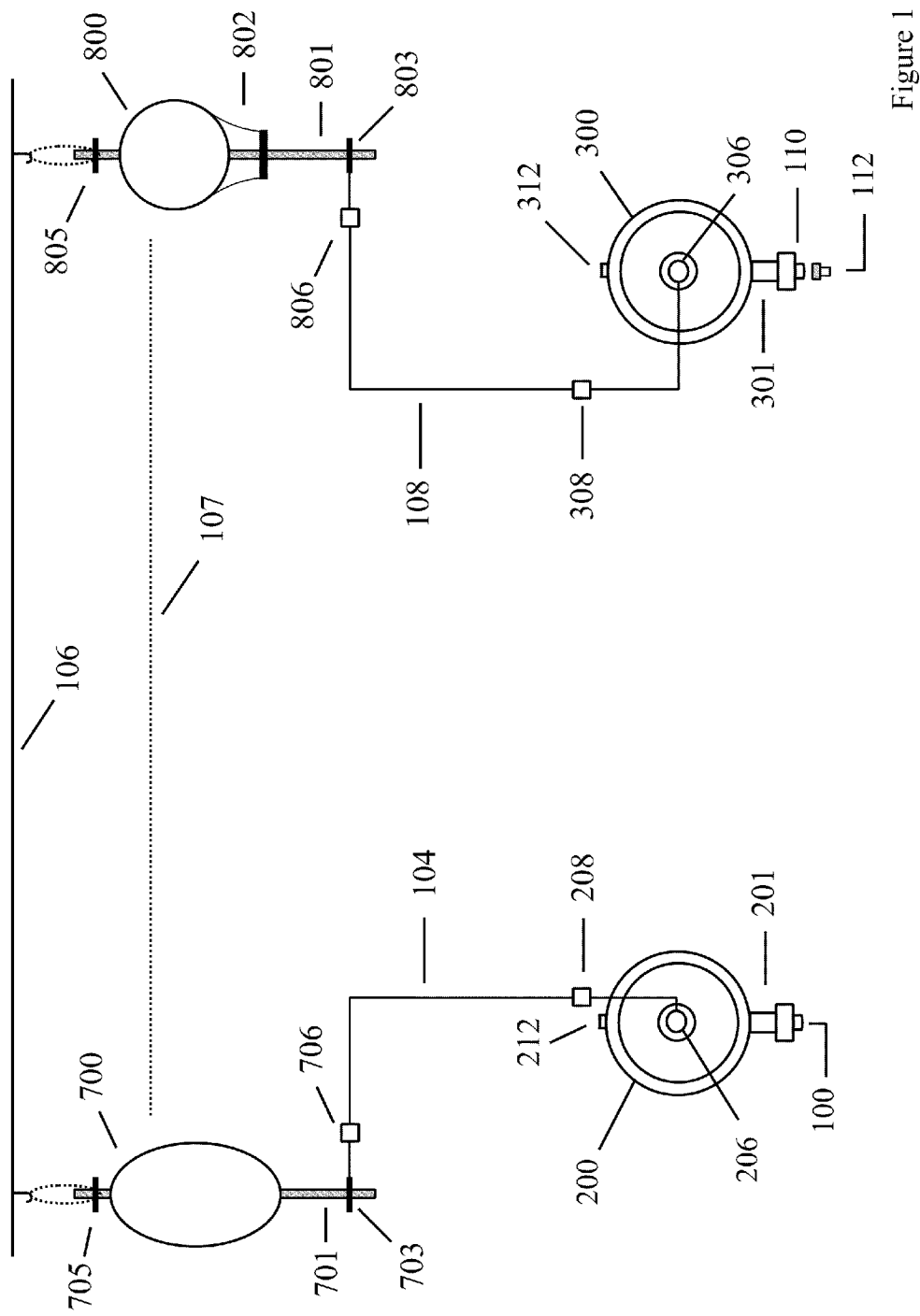

SYSTEM OF TRANSMISSION OF WIRELESS ENERGY

FIELD OF INVENTION

This invention relates to the transmission of electromagnetic energy in the form of currents through space and matter at controlled frequency, amplitude, and characteristic impedance to facilitate the transmission of power and information over medium-range distances for generalized use of powering robotic, cybernetic, and consumer devices tuned to acquire the transmission via singular and multiple receivers at singular or multiple resonant frequencies.

BACKGROUND OF THE INVENTION

Although this invention can be widely applied to wireless transmission in general, its main application is expected to be multiple resonance-frequency power and communication between a single source transmitter and multiple receivers which could be robotic colonies, cybernetic implants, or collections of consumer devices in the given range allowable by the ratio of transmission frequency to length of region as determined by the quarter-wavelength of the particular transmission.

BRIEF DESCRIPTION OF THE DRAWINGS

FIG. 1 shows a schematic, top-view, of the transmitter and receiver pair, receiver with a 'T' connection and stop termination on one output, and transmitter and receiver elevated capacities in the first embodiment of a system of transmission of wireless energy of the present invention.

DETAILED DESCRIPTION OF THE INVENTION

1

Referring now to FIG. 1, there is shown a first embodiment of a system of transmission of wireless energy of the present invention. This system comprises a set of four tuned circuits, termed in its composite form an "array", mounted on insulated background media made primarily of plastic called the elevated pad; to the left the transmitter pad and to the right the receiver pad mounted on an x-y plane, called "elements", and two elevated capacities each connected to the secondary coil of each pad.

Figure 2:
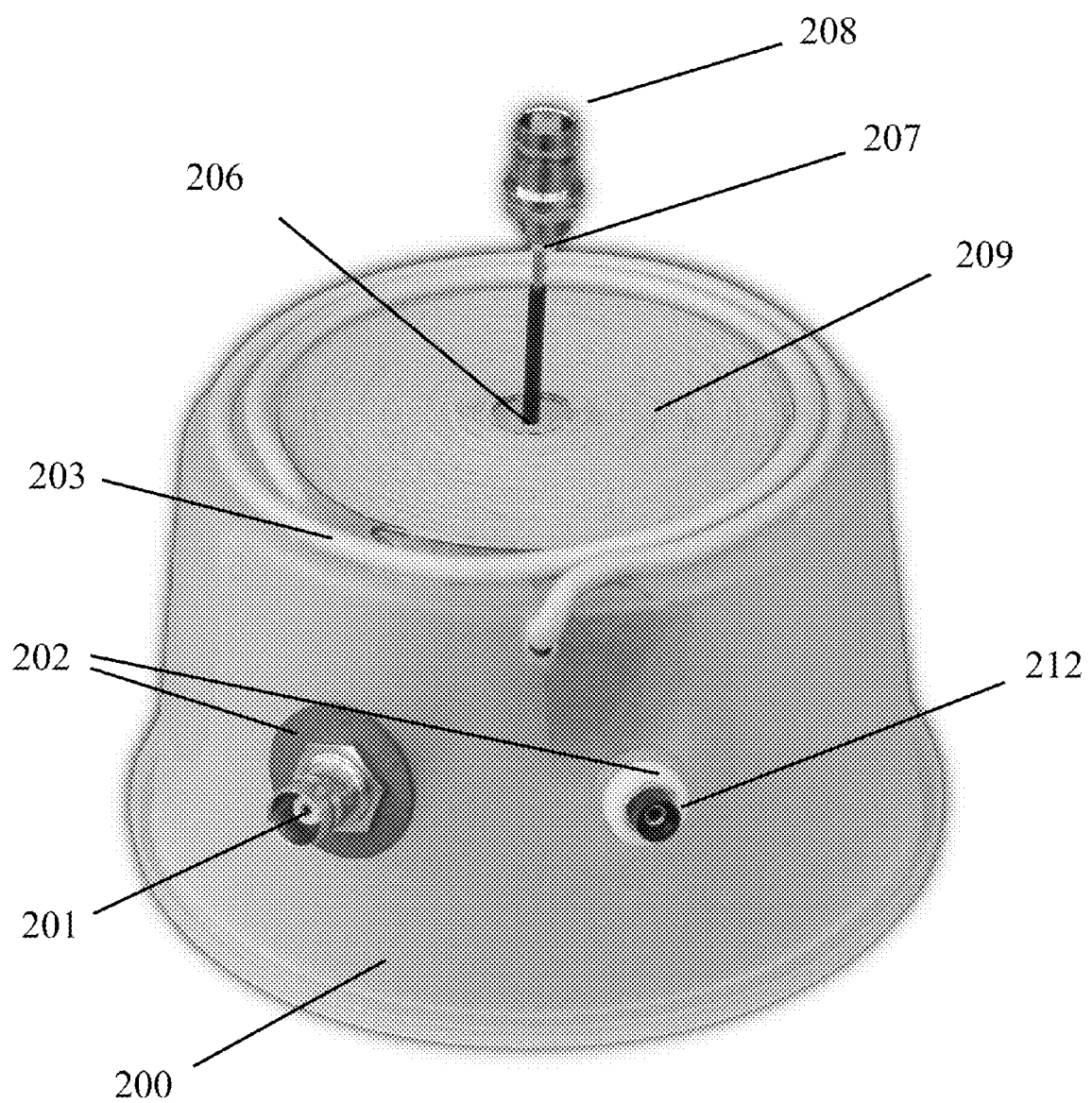
FIG. 2 shows a drawing, 60-degree-view, of the transmitter pad with companion drawing views 2a, an overhead view, 2b, an underside view, and 2c, a three-quarter rear angle view of the signal shaper, of the first and third embodiment of a system of transmission of wireless energy of the present invention.

The transmitter pad 200 and its cable 207, to the left of the figure, comprises the transmission aperture source of the wireless broadcast signal of the first and third embodiments of a system of transmission of wireless energy of the present invention, contains two elements wound in a pattern of an outward radiating spiral and is illustrated in FIG. 2.

Figure 3:
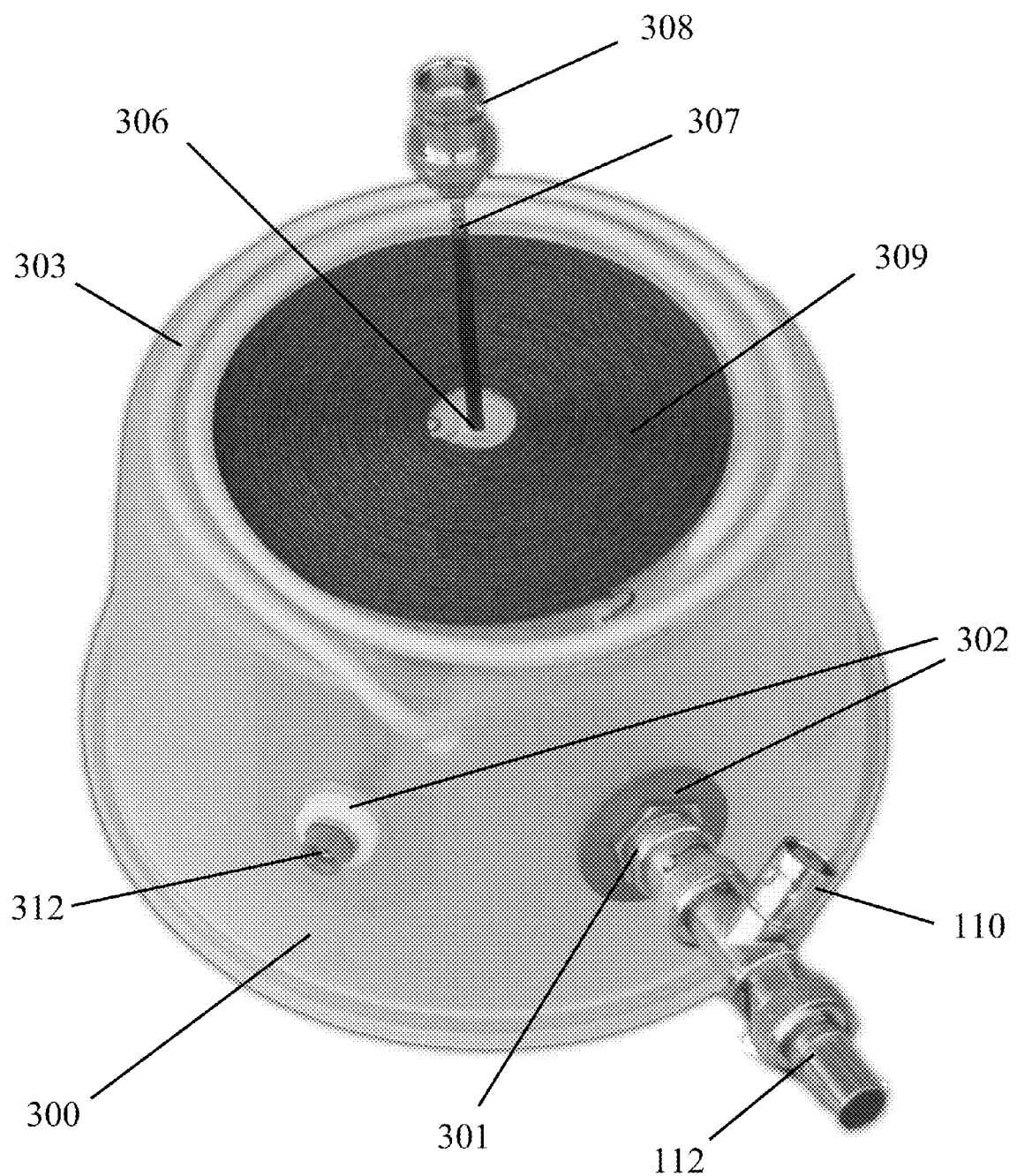
FIG. 3 shows a drawing, 60-degree-view, of the receiver pad with companion drawing views 3a, an overhead view, 3b, an underside view, and 3c, a three-quarter rear view of the signal shaper, of the first embodiment of a system of transmission of wireless energy of the present invention.

The receiver pad 300 and its cable 307, to the right of the figure, comprises the aperture sink of the wireless broadcast signal of the first and third embodiments of a system of transmission of wireless energy of the present invention, contains two elements wound in a pattern of an outward radiating spiral and is illustrated in FIG. 3.

The elements may be constructed of any suitable conducting material including, by way of example, wound wire, patterns etched on a PC board, and sprayed conducting material on an insulating background.

The array is designed to function and possess a similar behavior of a cavity resonator, in the same manner as N. Tesla (U.S. Pat. No. 645,546), possessing the same velocity-inhibitions, however whose utility and increase of efficiency is listed herein. The array of the first embodiment—as well as the other five embodiments of a system of transmission of wireless energy of the present invention—possesses harmonic frequencies at fixed intervals and shown in FIG. 1a.

The signal flow represented in the schematic pattern of the first embodiment of a system of transmission of wireless energy of the present invention is: a system whose desirable operating properties are capable of transmitting an external radio-frequency signal in the form of a piece of equipment as hardware or software 100 of a preferred range 40 to 400 MHz but not limited necessarily to this range, connected to a matched-Impedance terminal with a typical BNC female fitting 201 receives this input signal introducing it to the primary coil 203 where it is transferred to the secondary coil 209 of FIG. 2.

Figure 1A:
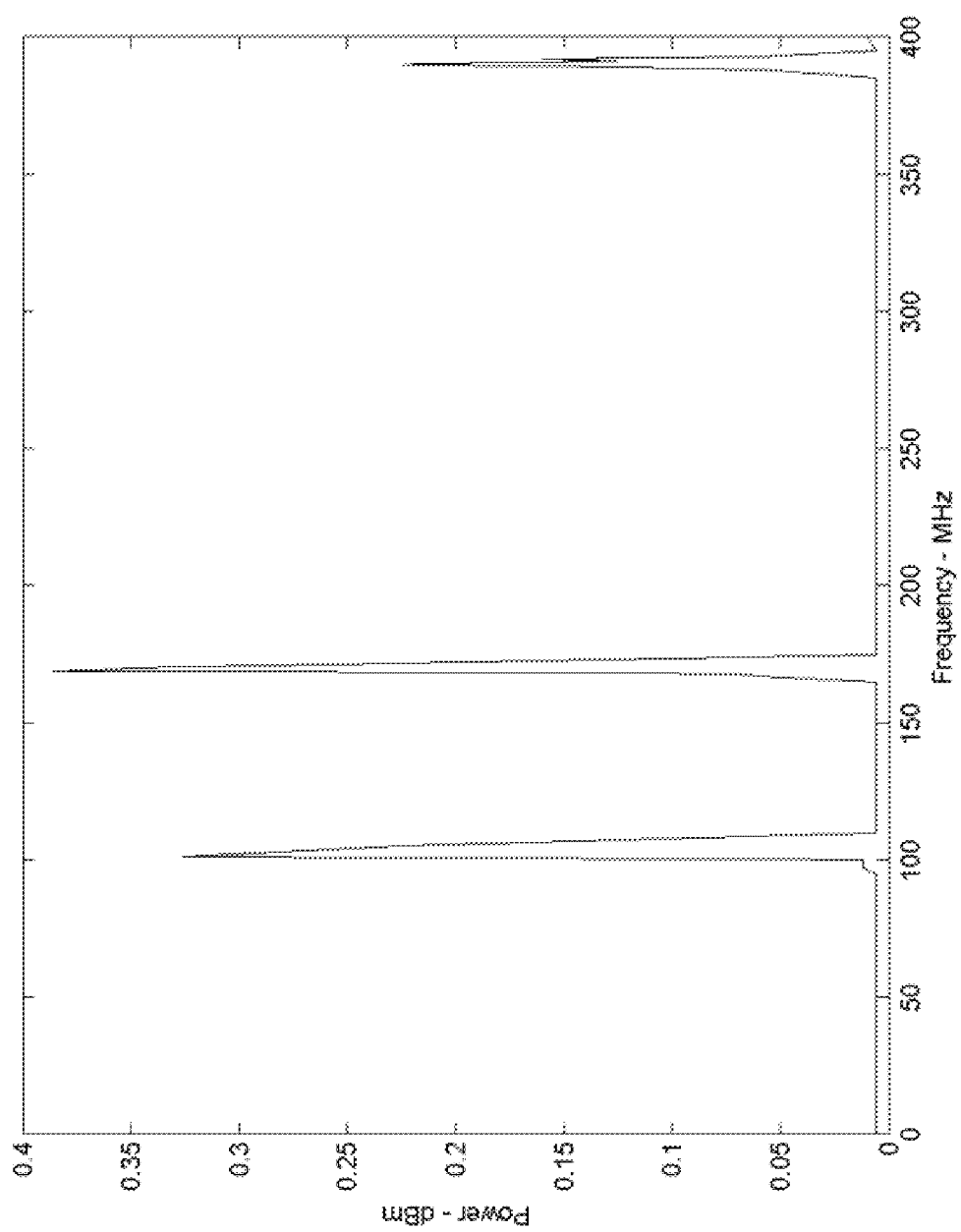
FIG. 1a shows a mathematical representation in the form of a plot of the spectral pattern of a swept frequency relevant to all six embodiments of a system of transmission of wireless energy of the present invention.

The input signal is coupled to the electromagnetic field object manifest as a consequence of the peculiarity of the circuit symmetry, that is, as a geodesic isomorphism, demonstrated here in the first embodiment of a system of transmission of wireless energy of the present invention. The field object acts as a cavity resonator where a signal traveling within its corridors specified by the harmonics illustrated in FIG. 1a is transported through the structure because of the high degree of internal reflection of the structure of the electromagnetic field object. The corridor, defined by the spectral pattern, consists of polarized apertures at each end of the circuit consistent with the academic concept of isomorphism, that is, as a property of the radius of the secondary coil the transmitter and receiver packages 209 and 309 respectively. At resonance, the corridor allows an efficient transit of the externally-stimulated signal both in magnitude and modulation which could be amplitude modulation (AM), frequency modulation (FM), pulse modulation, and/or a combination of these.

In this arrangement, the signal from the source 100 is broadcast across each half of the tuned circuits $L_1C_1$ given by 200 and $L_2C_2$ given by 300 where the difference in equality of state of $L_1C_1$ and $L_2C_2$ forming a conductive path at resonance. On the surface of this conductive path is transmitted the sinusoidal pattern given as an oscillation of energy between the electric E and magnetic B vector governed by the range-shifting impedance vector H along the surface of the resonance cavity as mathematically presented by John Henry Poynting in publications from the period 1884 to 1909 and demonstrated as a velocity-inhibited resonator by N. Tesla to the U.S. Patent office 15 Nov. 1897 regarding N. Tesla U.S. Pat. No. 645,576 (1900).

The spiral elements 203, 209 of FIG. 2 and 303, 309 of FIG. 3 are basically circular in shape and whose conical height is equal to twice that of the cross-sectional radius of the coil wire, although the principles of the present invention are applicable to nearly-flat spiral antennas of any shape. The radius of the coils form the walls of the transmittance aperture determining its size: at a distance approximately ⅓ from the radial center, forms the inner ring of the aperture; at a distance approximately ⅔ from the radial center, forms the outer ring of the aperture where between traverse as currents within the field object at multiple octaves of the resonance frequency.

The amplitude of the input signal is split across terminal 201 in FIG. 2. Along this primary coil oscillates the sinusoidal components transferred to the secondary coil 209 by the commonly-understood concept first detailed by Michael Faraday concerning near-field induction. By the relationship of the coupling between the primary and secondary coils 203 and 207 at a suitable rate of Q, the properties including any harmonics in the stimulus frequency and its energy are discharged to the electromagnetic field object by the action at the capacitance stored in the elevated aerials, forming a complete LC circuit at one of several resonance frequencies, each with their own properties, or channels, and degrees of internal reflection.

For the purposes of the arrangement illustrated in FIG. 2, the resonance frequency of the first embodiment of a system of transmission of wireless energy in the present invention is 27.255 MHz or possessing a wavelength of 11 meters. This is typical of performance of this variation but is not necessarily limited to this particular observed frequency only.

These and other scenarios are present in this system as long as the criteria that they are designed to be responsive to the resonance frequencies of the apparatus is met. Some possible, but not limited to these, variations are illustrated in FIGS. 4, 9, 10, 11, and 12.

Elevated aerials 700 and 800 are attached to an overhead support such as beam in a building or an artificial floor-to-overhead structure 106, or even gas-filled balloons although these are not the limit. Relative to the chosen elevation dependent upon application, an appropriate length of shielded cable of matched impedance is required 104 and 108, for example, at an elevation of 2 meters with a length of BNC 50 ohm RG-58U coaxial cable with a capacitance of 33 pF per meter. Elevated aerial 700 is in the shape of a three-dimensional ellipsoidal whose belt is offset approximately ⅓ of the distance of its height from 703; appearing egg-shaped, the preferred shape of the aerial for maximum performance, constructed, for example, of highly conductive and reflective material such as polished stainless steel and intersected at its volumetric center by a threaded mounting fixture 701 and connected at 706 to the secondary winding of the transmitter pad through bore hole 206. Elevated aerial 800 is of a spherical shape, although it can be of other volumetric shapes, smaller in volume than 700, and whose shape is of less relevance and construction, for example, of partially conductive and reflective material such as aluminum or tin-coated brass and intersected at its volumetric center by a threaded mounting fixture 801 and connected at 806 to the secondary winding of the receiver pad through bore hole 306.

Figure 13:
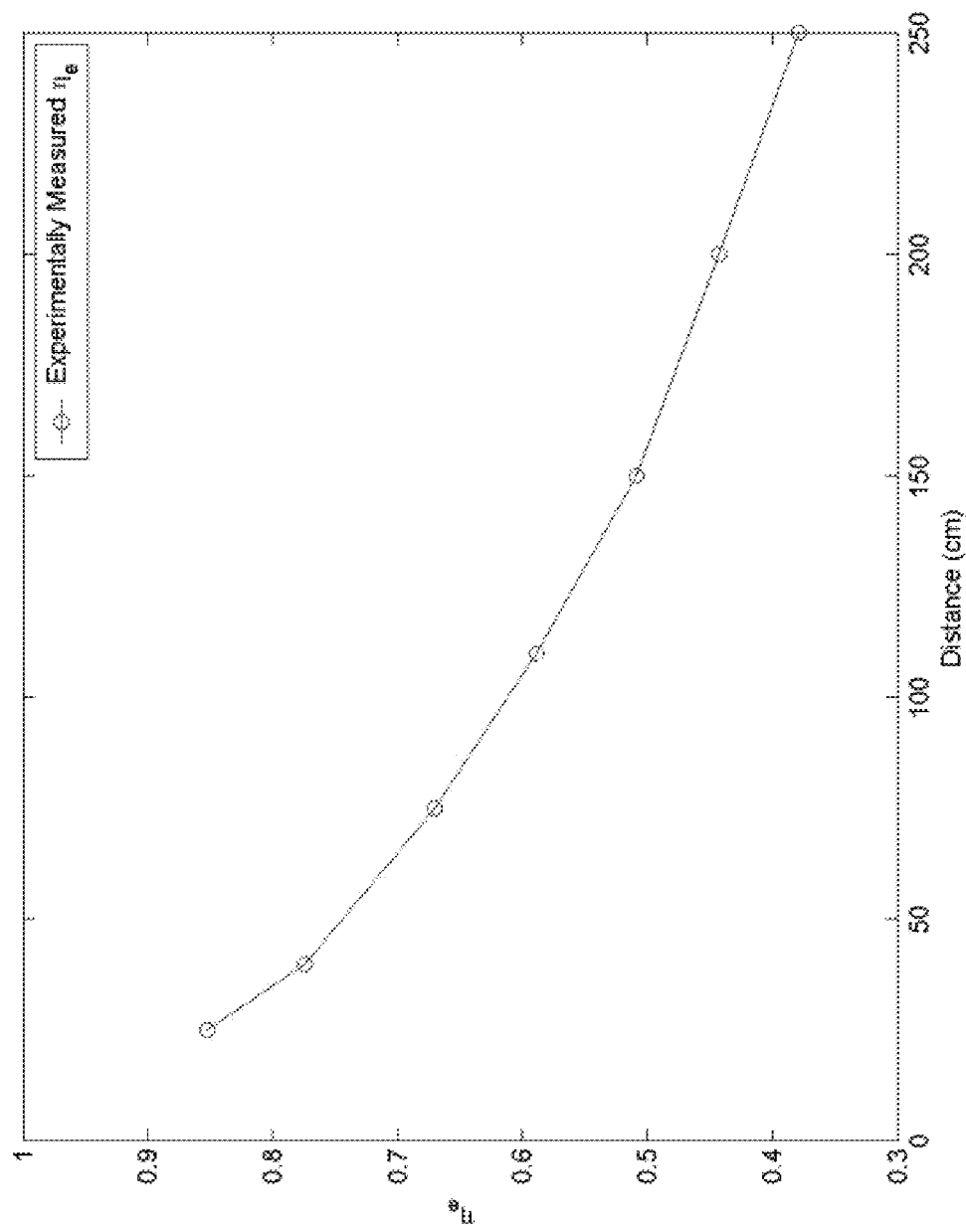
FIG. 13 shows a mathematical plot of the power efficiency transmitted across the array as a function of the frequency of the input signal oscillator or source at a distance of 225 centimeters of all six embodiments of a system of transmission of wireless energy of the present invention.
Figure 14:
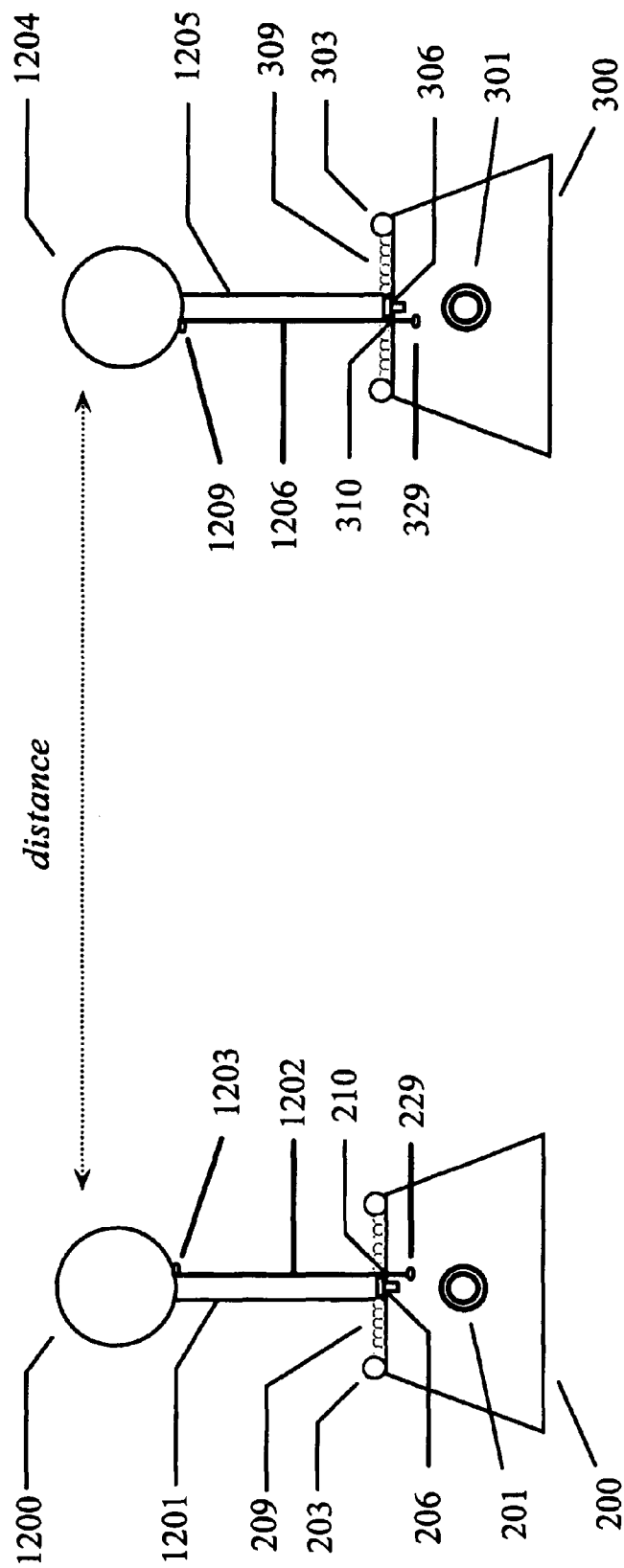
FIG. 14 shows a schematic, facing view cross-section, of the transmitter and receiver pair using a component such as a capacitance sphere elevated at a close distance from the surface of the transmitter and receiver pads of the sixth embodiment of a system of transmission of wireless energy of the present invention.

Elevated aerials 700 and 800 are separated by a distance 107 where the relationship between the input frequency, in this example, from a sinusoidal source such as an oscillator or signal generator 100 and an acceptable level of power reception 110 is desired. A plot of the receiver power as a function of distance is illustrated in FIG. 13. This plot shows the efficiency of the array given optimal operational parameters at particular distances.

The energy dispersed by the first embodiment of a system of transmission of wireless energy of the present invention is dependent upon the signaling capacity of the input source 100 and any accompanying amplification schemes present. The array fulfills the primary purpose of coupling signal and energy from an external source to a wireless scheme conformant to modern techniques allowing commonly-available test equipment to be connected wherein the signals can be monitored and measured, the received signal 110 processed by a remote device, or realized as work in a loaded circuit by an independent machine designed to consume normalized power.

The signal dispersed by the first embodiment of a system of transmission of wireless energy of the present invention is broadcast at no less than two predominant resonance frequencies and a collection of sub-resonance and harmonic frequencies at distances suitable for the transmission of wireless power; the lower frequency manifesting when the elevated aerials are present, and the higher frequency manifesting without the presence of the elevated aerials. FIG. 13 shows the performance characteristic of the signal disbursed by the first embodiment of a system of transmission of wireless energy of the present invention.

Referring now to FIG. 1a, there is shown the spectral pattern of the first embodiment of a system of transmission of wireless energy of the present invention. This spectral pattern is displayed as a sweep of frequencies from 0 to 400 MHz similar to such a display shown on a piece of test equipment such as a spectrum analyzer. The y-axis is the power level measured over 50 ohms at one volt. Looking at the figure from left to right, the peaks at the frequencies 101 MHz, 169 MHz, and 390 MHz form the broadcast signature of this array, dependent upon the construction of it. These "harmonics" are a persistent signature whether or not a radio-frequency sinusoidal signal of the prescribed resonant range, which in terms of this particular array, is approximately 53 MHz or 27 MHz if elevated aerial capacities 700 and 800 are attached. These harmonics form the features of the construction of the field object, that is, the electromagnetic energy suspended between the transmission and receiving elements 200 and 300 respectively. The spectral pattern exhibited by FIG. 1a is inclusive of broadcast patterns in the other five embodiments of a system of transmission of wireless energy of the present invention illustrated in FIGS. 4, 9, 10, 11, and 12.

2

Referring now to FIG. 2 and its companion views a, b, c, and d, there is shown the transmitter pad element 200 of the first and third embodiments of a system of transmission of wireless energy of the present invention consisting of primary and secondary windings 203, 209 respectively and its connector cable 207. The transmitter pad 200 comprises a 50 ohm female BNC terminal 201 and a pin tip terminal 212 shielded by non-conductive elements 202. The terminals 201 and 212 can be of an alternative type as long as connection 201 has two throughputs, a high level and low level port designed for minimum wave loss and has a characteristic impedance of 50 ohms, while 212 has a single throughput.

The primary winding coil 203 comprises a circular-radiating element in the form of a spiral with a negative rotation about an x-y plane in a counter-clockwise direction whose wire size in this example is AWG 12. A stranded wire of copper, steel, or suitable conducting medium wrapped in an insulated component such as rubber, plastic or other suitable non-conductive material where the number of turns about the common center 206 is approximately 1.85 but can be more or less turns depending upon the number of turns present in the secondary winding 209 in terms of the desired set of resonance frequencies in the array. The connector cable 207 comprises a piece of conductive wire of reasonable size and stiffness so as to connect to 229 and support a BNC-style connector 208 for use with 50 ohm cable 104 to elevated aerial 700 at its BNC-style connection 706.

Figure 2A:
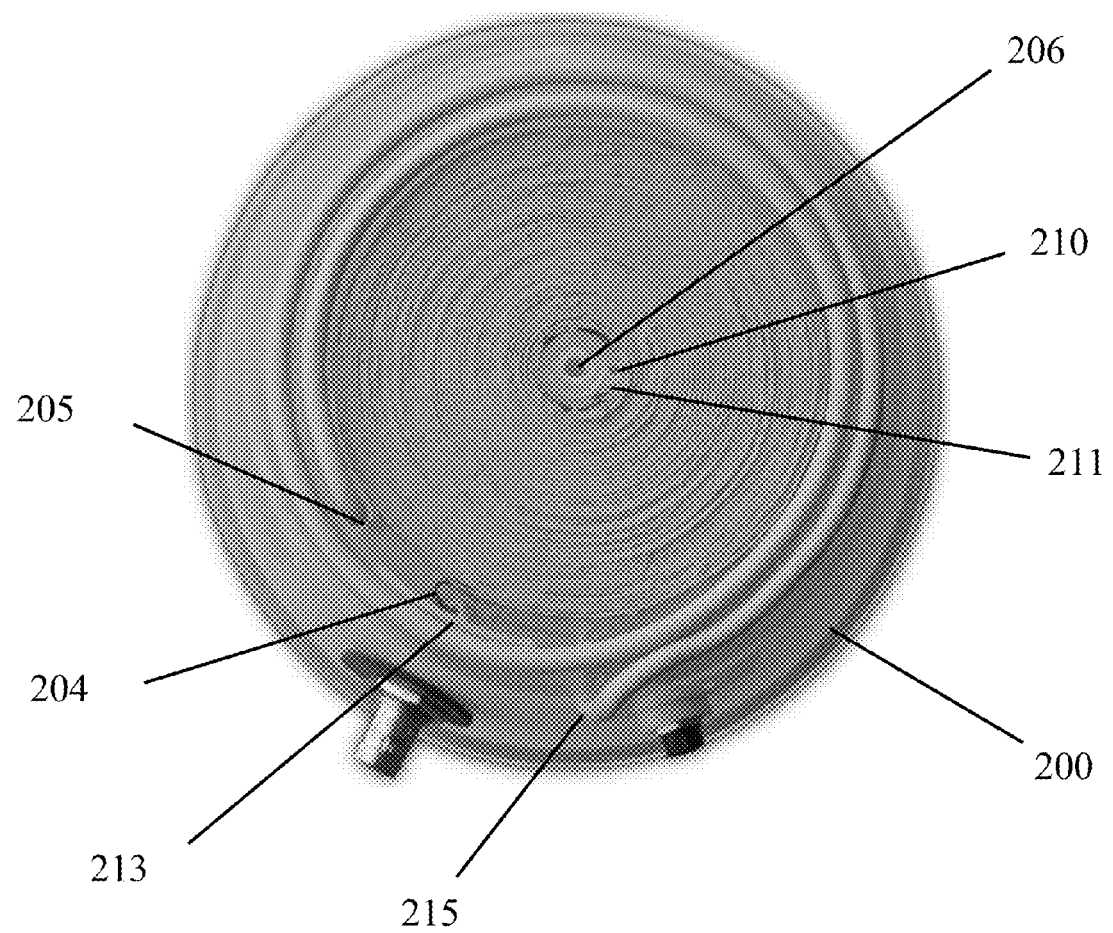
FIG. 2d shows a drawing, front view, of the tickler coil of the second and fourth embodiment of a system of transmission of wireless energy of the present invention.
Figure 2B:
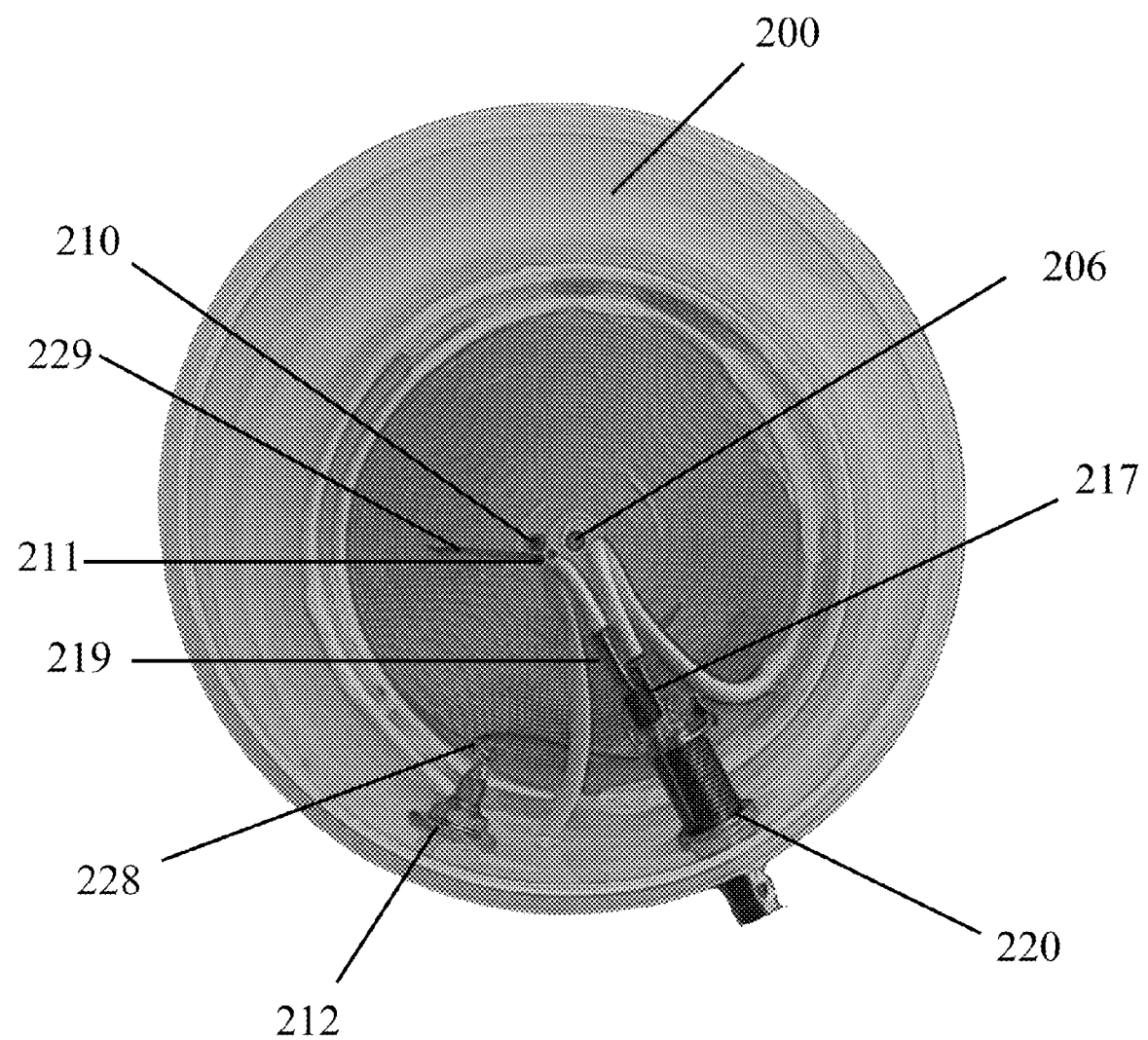

Referring now to FIG. 2a and its companion view FIG. 2b, there is shown a overhead top-down view and an underside bottom-up view respectively of the primary windings 203 shown in companion view FIG. 2 mounted to the transmitter pad element 200 used in illustrated configuration of all six embodiments of a system of transmission of wireless energy of the present invention. The ends of the primary winding 203 are found under the coil pad through bore-holes 205, 215 shown in FIG. 2a, approximately 30 degrees offset from the center line drawn by 206 and marker 204, close-fitting to the diameter of the wire so that it holds the coil of wire snugly to the pad. The coil of wire is attached to the pad by an epoxy glue or some other suitable adhesive although the wire could be attached to the pad by some other means such as tape, clips, or ties as long as the material of the attachment does not come into metallic contact with the wire nor allow a great dispersal of the axial electromagnetic field. The ends 217 and 219, shown in FIG. 2b, of the primary wire 203 are clamped into a segment of tubing, in this example brass, of an appropriate size so that it is snug. Ends 217 and 219 connected to junctions in this example, brass 224, 226 respectively at signal shaper 220 of FIG. 2c which contains the 50 ohm female BNC terminal 201. The width of the gap between neighboring arms of the radiating coil of wire along the spiral is no greater than that of the wire's width, for example AWG 12. Bore hole 215 is offset two wire diameters negative from the x-y plane of the primary coil 203 with an acceptable variation of +/−20%.

The secondary winding or coil 209 comprises a radiating element in the form of a spiral of conductive wire with a rotation about an x-y plane in a counter-clockwise direction whose size, in this example, is AWG 20.5. An enameled conducting material, for example, magnet wire or other suitable conducting medium capable as such, where the number of turns about the common center 206 is approximately 40.25, but can be more or less turns depending on which resonance frequencies are desirable given the application of the array in its particular configuration.

Referring now to FIG. 2a and its companion view FIG. 2b, there is shown a overhead top-down view and an underside bottom-up view respectively of the secondary windings 209 shown in companion view FIG. 2 mounted to the transmitter pad element 200 used in the configuration of all six embodiments of a system of transmission of wireless energy of the present invention. The ends of the secondary winding 209 are found under the coil pad with bore holes 211, 213 close-fitting to the diameter of the wire so that it holds the coil of wire snugly to the pad. The coil of wire is attached to the pad by an epoxy glue or some other suitable adhesive although the wire could be attached to the pad by some other means such as tape, clips, or ties as long as the material of the attachment is non-conductive although adhesive is the preferred method. The width of the gap between neighboring arms of the radiating coil of wire along the spiral is no greater than that of the wire's width, for example AWG 20.5 but is preferred to be as minimal as possible. Bore hole 213 is placed on the center line formed between the common center 206 and 220. Bore hole 211 is placed 90 degrees offset from this center line. The common center 206 is of a suitable size so that it contains the scale of the pad surface and allows connection 207 comprising a 50 ohm female BNC terminal 208 shown in FIG. 2c. The end of the secondary wire 209 through bore hole 213 connects to terminal 212 at connection 228 which, in this instance, is available as a standardized connection. The other end of the secondary wire 209 through bore hole 211 is available as a connection 229 to one of the other differing configurations in the second, fourth, and fifth embodiments of a system of transmission of wireless energy of the present invention.

In the first embodiment, connection 229 is deployed connecting to wire 207 with a BNC-style connection 208. This arrangement is most useful in the first embodiment of a system of transmission of wireless energy of the present invention at frequencies lower than 50 MHz. At higher frequencies, it is ideal to not include 207 for best performance as the elevated aerial capacities 700, 800 are unnecessary and it is suggested to increase performance of the array, that is, improve the efficiency of the power transmitted, to include an attachment of a staff and elevated sphere illustrated in FIG. 12 or to add the tickler coils 232 illustrated in FIG. 2d utilizing the mobile receiver card 500 illustrated in FIG. 5.

Figure 2C:
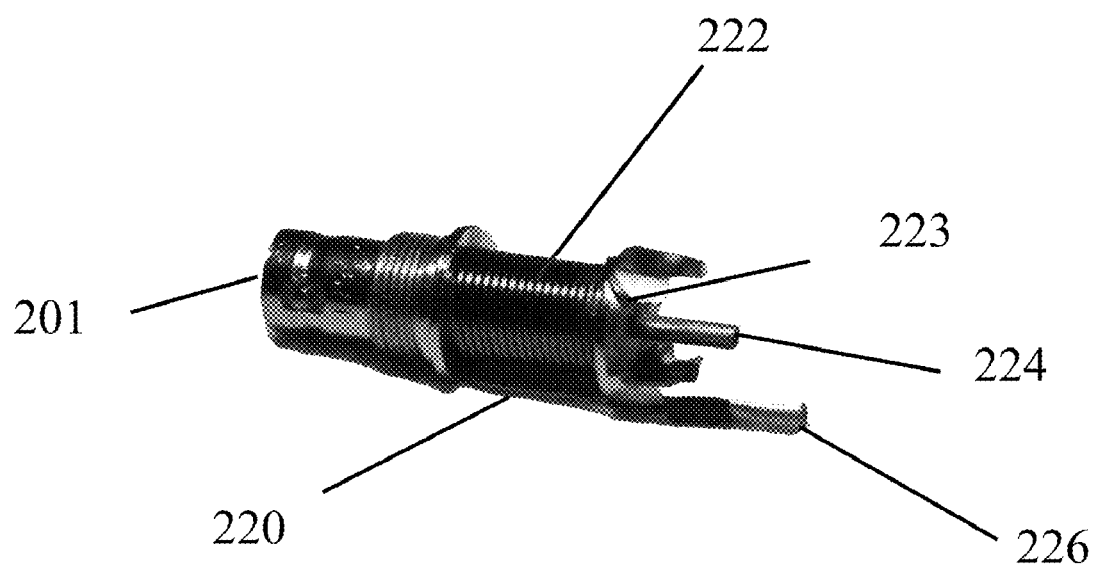
Figure 2D:
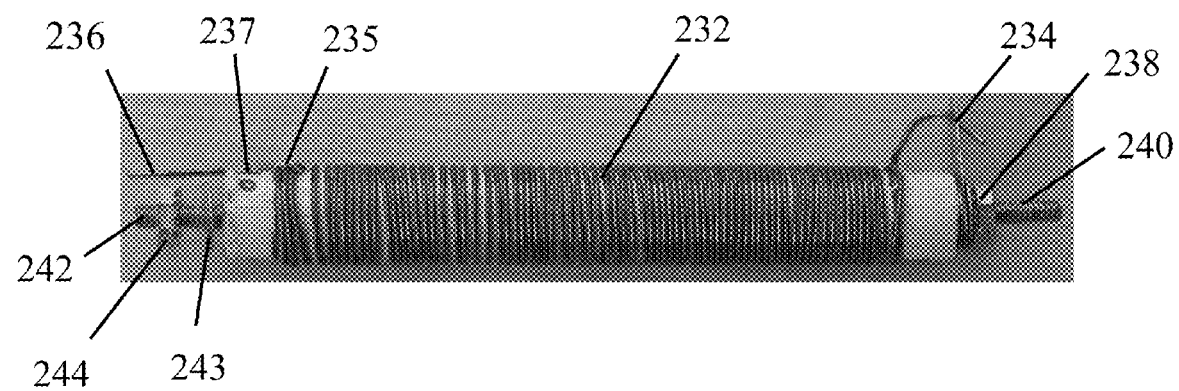
Figure 12:
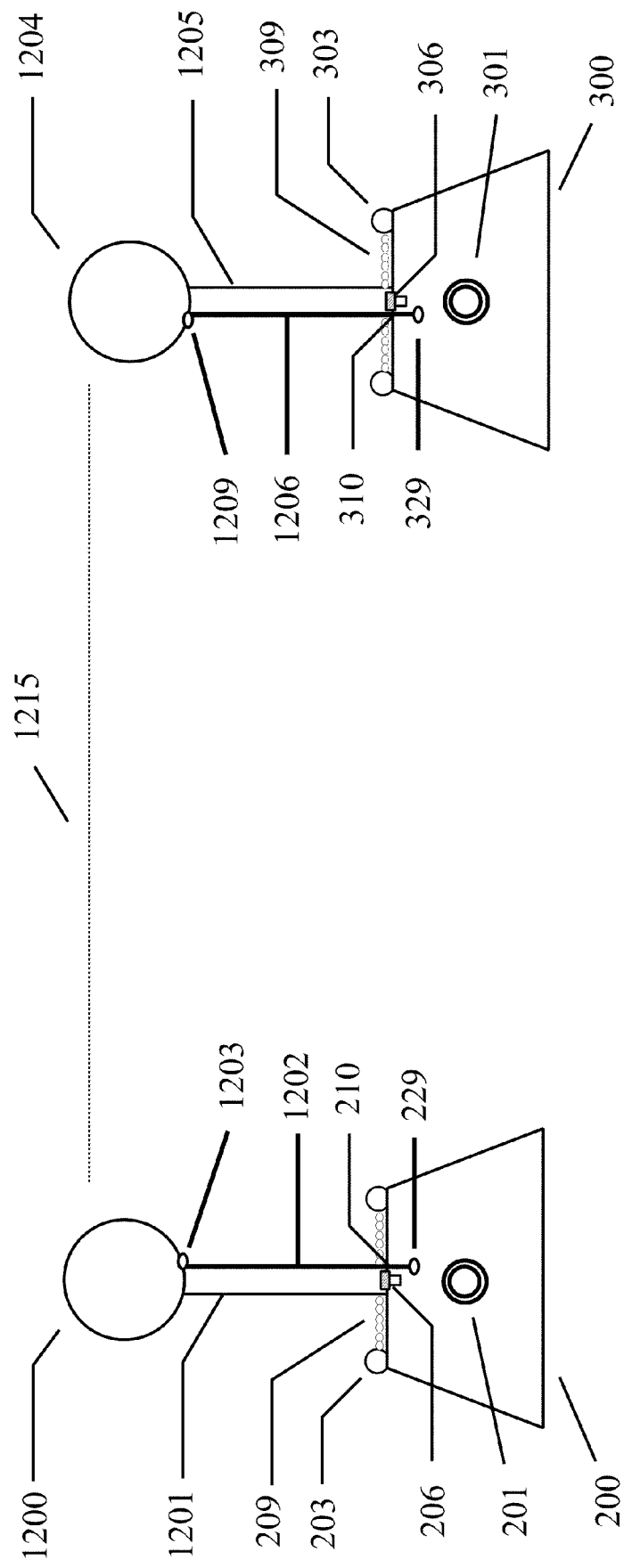
FIG. 12 shows a schematic, front view cross-section, of the transmitter and receiver pair exposing the windings of the coils inclusive of elevated spheres in the sixth embodiment of a system of transmission of wireless energy of the present invention.

The gap between the common center 206 and bore holes 210 and 211 in the secondary winding 209 is such that it can accept the mount 242 for a tickler coil shown in FIG. 2d for use in the second embodiment of a system of wireless energy of the present invention or the mount for a staff 1201 and elevated sphere 1200 shown in FIG. 12 for use in the sixth embodiment of a system of wireless energy of the present invention. The hole at the common center 206 accepts a threaded mount 235 from tickler coil 232 or the staff 1201 set upright in the z-direction respective to the x-y plane of the pad, bore hole 210 accepts a wire from one end 236 of the tickler coil 232 or from one end 1202 of the staff 1201 with elevated sphere 1200 so that it extends beneath the coil pad connecting to terminal 229. In this example, the radius of the gap is 1 cm but can be more or less depending on the desired resonance frequency, that is, the number of turns that are desired given the particular resonance frequency required as per the specific application but not limited to it.

Referring now to FIG. 2c, there is shown a three-quarters rear-to-front view of the signal shaper 220 used in all six embodiments of a system of transmission of wireless energy of the present invention. The fuselage encapsulating the connection 201 is a Hewlett-Packard part number 1250-1671 but the unit itself is not included in the patent application. It serves as a useable part in the present invention. The unit is not modified, rather, wrapped in the same wire gauge as the secondary coil with the number of turns being 18 to give it the property of a tickler coil stimulating the transfer of the signal to the secondary coil, in essence "warming-up" the transmission circuit. The resistance of the winding 222 slows the velocity of the incoming signal in its low capacity while its maximum component passes through the center of the field creating a differential between each amplitude minimum and maximum in the frequency cycle. One end of the tickler coil 222 connects to a leg on the pinned-end 223 to the other end is nuzzled at the housing just behind the thread-path collar of connection 201, each touch-point enameled insulator is removed from the wire to allow contact between the conductor and the housing. The fuselage has ends for the center and housing, the center and one squared-housing pin are pressed with a piece of tubing 224, 226, in this example brass, each of which are of a sufficient size to allow a snug connection to a matched set of tubes 217, 219 of FIG. 2b connecting the primary coil winding to the source input represented in the BNC-style connection 201. This signal shaper, therefore, allows the incoming signal from the source oscillator or signal generator to be modified in such a manner as already described to be appropriate as a stream of energy, broadcast without wires to distant objects in such fashion and be transformed back into its original sinusoidal components. The fuselage in its present usage can be of another type so long as it allows a coaxial connection, has a length necessary to facilitate the length of winding 222, and a connection, which herein is a BNC-style but is not necessarily limited to it.

Referring now to FIG. 2d, there is shown an overhead view the tickler coil 232 used in the second and fourth embodiments of a system of transmission of wireless energy of the present invention. Separate from the tickler coil 232 is a mount 237 consisting of an insulated circular cylinder of a material such as in this example is wood or plastic but can be of any suitable material so long as it is non-conductive and reasonably solid so as to form a base on which coil 232 can be wound or left empty extending the component to serve as an insulated mount 1201 in the fifth and six embodiments of a system of transmission of wireless energy of the present invention. To the left of the figure is the lower mounting stud 242 constructed, in this example, of stainless steel with a typical stainless steel washer 243 and fastener nut 244. The lower mounting stud 242 serves to attach the mount 237 to the transmitter pad element 200 via the bore hole 206. To the right of the figure is the upper mounting stud 240 constructed, in this example, of stainless steel with a lead connector 234 constructed, in this example, of hobby brass with a fastener nut 238. The upper mounting stud 240 serves to attach the mount 237 to the elevated sphere 1200.

The tickler winding or coil 232 comprises a radiating element in the form of a cylindrical-shaped conductive wire with a rotation about the length of the mount 237 in a clockwise direction whose size, in this example, is AWG 20.5 and attached to 237 by adhesive and clip 235. An enameled conducting material, for example, magnet wire or other suitable conducting medium capable as such, where the number of turns about the mount 237 is approximately 74.75, but can be more or less turns depending on which frequency-to-power ratio is desirable given the application of the mobile card 500 in its particular configuration.

Connection wire 236 passes through bore hole 210 so as to connect with the secondary coil 209 at 229 to provide a direct connection for the signal path. It is not necessary, however, to connect 236 to 229 if it is desirable to absorb the energy from the signal path in the electromagnetic field.

3

Referring now to FIG. 3 and its companion views a, b, c, and d, there is shown the transmitter pad element 300 of the first and third embodiments of a system of transmission of wireless energy of the present invention consisting of primary and secondary windings 303, 309 respectively and its connector cable 307. The transmitter pad 300 comprises a 50 ohm female BNC terminal 301 and a pin tip terminal 312 shielded by non-conductive elements 302. The terminals 301 and 312 can be of an alternative type as long as connection 301 has two throughputs, a high level and low level port designed for minimum wave loss and has a characteristic impedance of 50 ohms, while 312 has a single throughput.

The primary winding coil 303 comprises a circular-radiating element in the form of a spiral with a negative rotation about an x-y plane in a counter-clockwise direction whose wire size in this example is AWG 12. A stranded wire of copper, steel, or suitable conducting medium wrapped in an insulated component such as rubber, plastic or other suitable non-conductive material where the number of turns about the common center 306 is approximately 1.85 but can be more or less turns depending upon the number of turns present in the secondary winding 309 in terms of the desired set of resonance frequencies in the array. The connector cable 307 comprises a piece of conductive wire of reasonable size and stiffness so as to connect to 329 and support a BNC-style connector 308 for use with 50 ohm cable 104 to elevated aerial 700 at its BNC-style connection 706.

Figure 3A:
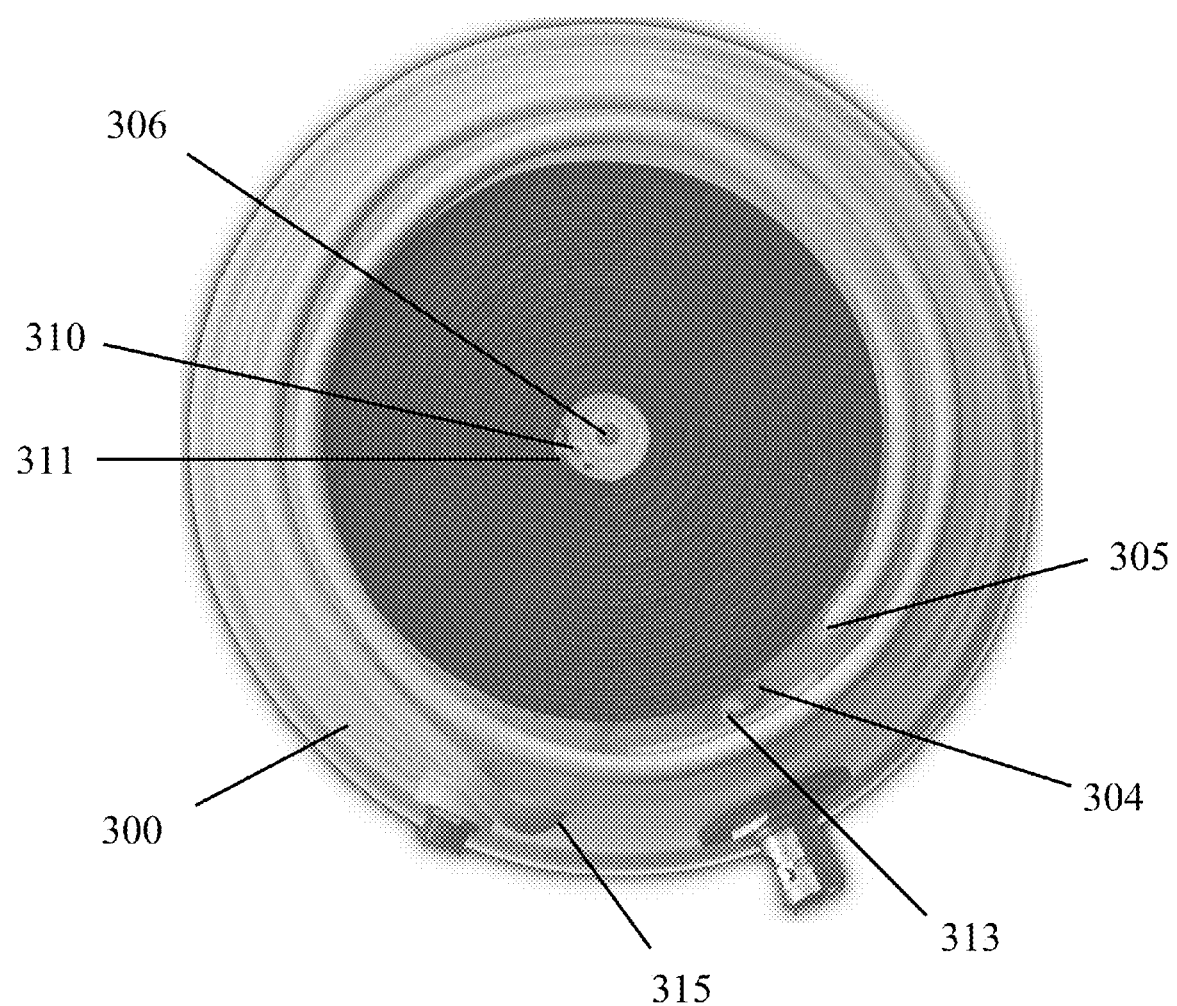
FIG. 3d shows a drawing, front view, of the scant tickler coil with of the second and fourth embodiment of a system of transmission of wireless energy of the present invention.
Figure 3B:
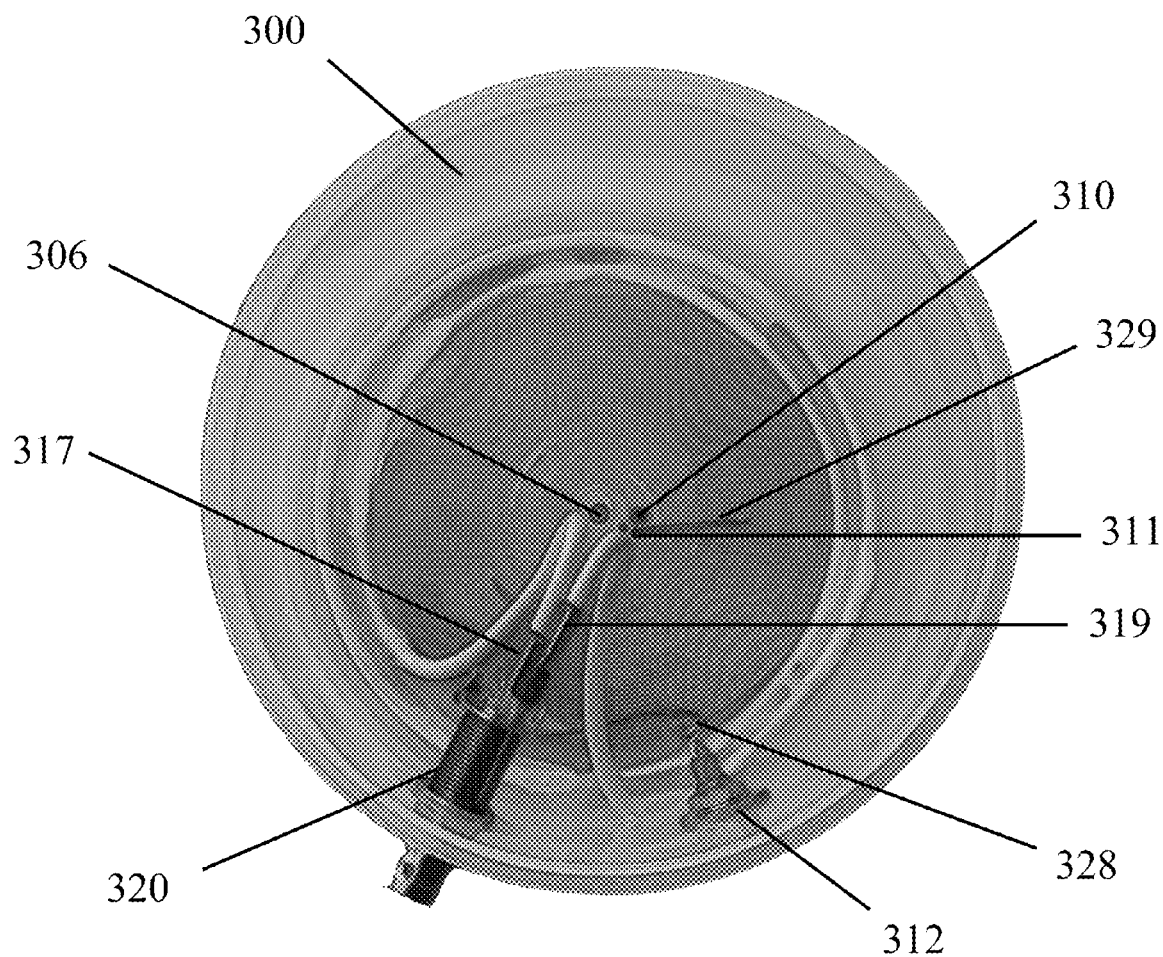

Referring now to FIG. 3a and its companion view FIG. 3b, there is shown a overhead top-down view and an underside bottom-up view respectively of the primary windings 303 shown in companion view FIG. 3 mounted to the receiver pad element 300 used in the configuration of all six embodiments of a system of transmission of wireless energy of the present invention. The ends of the primary winding 303 are found under the coil pad through bore-holes 305, 315 shown in FIG. 3a, approximately 30 degrees offset from the center line drawn by 306 and marker 304, close-fitting to the diameter of the wire so that it holds the coil of wire snugly to the pad. The coil of wire is attached to the pad by an epoxy glue or some other suitable adhesive although the wire could be attached to the pad by some other means such as tape, clips, or ties as long as the material of the attachment does not come into metallic contact with the wire nor allow a great dispersal of the axial electromagnetic field. The ends 317 and 319, shown in FIG. 3b, of the primary wire 303 are clamped into a segment of tubing, in this example brass, of an appropriate size so that it is snug. Ends 317 and 319 connected to junctions in this example, brass 324, 326 respectively at signal shaper 320 of FIG. 3c which contains the 50 ohm female BNC terminal 301. The width of the gap between neighboring arms of the radiating coil of wire along the spiral is no greater than that of the wire's width, for example AWG 12. Bore hole 315 is offset two wire diameters negative from the x-y plane of the primary coil 303 with an acceptable variation of +/−20%.

The secondary winding or coil 309 comprises a radiating element in the form of a spiral of conductive wire with a rotation about an x-y plane in a counter-clockwise direction whose size, in this example, is AWG 20.5. An enameled conducting material, for example, magnet wire or other suitable conducting medium capable as such, where the number of turns about the common center 306 is approximately 40.25, but can be more or less turns depending on which resonance frequencies are desirable given the application of the array in its particular configuration.

Referring now to FIG. 3a and its companion view FIG. 3b, there is shown a overhead top-down view and an underside bottom-up view respectively of the secondary windings 309 shown in companion view FIG. 3 mounted to the transmitter pad element 300 used in the configuration of all six embodiments of a system of transmission of wireless energy of the present invention. The ends of the secondary winding 309 are found under the coil pad with bore holes 311, 313 close-fitting to the diameter of the wire so that it holds the coil of wire snugly to the pad. The coil of wire is attached to the pad by an epoxy glue or some other suitable adhesive although the wire could be attached to the pad by some other means such as tape, clips, or ties as long as the material of the attachment is non-conductive although adhesive is the preferred method. The width of the gap between neighboring arms of the radiating coil of wire along the spiral is no greater than that of the wire's width, for example AWG 20.5 but is preferred to be as minimal as possible. Bore hole 313 is placed on the center line formed between the common center 306 and 320. Bore hole 311 is placed 90 degrees offset from this center line. The common center 306 is of a suitable size so that it contains the scale of the pad surface and allows connection 307 comprising a 50 ohm female BNC terminal 308 shown in FIG. 3c. The end of the secondary wire 309 through bore hole 313 connects to terminal 312 at connection 328 which, in this instance, is available as a standardized connection. The other end of the secondary wire 309 through bore hole 311 is available as a connection 329 to one of the other differing configurations in the second, fourth, and fifth embodiments of a system of transmission of wireless energy of the present invention.

In the first embodiment, connection 329 is deployed connecting to wire 307 with a BNC-style connection 308. This arrangement is most useful in the first embodiment of a system of transmission of wireless energy of the present invention at frequencies lower than 50 MHz. At higher frequencies, it is ideal to not include 307 for best performance as the elevated aerial capacities 700, 800 are unnecessary and it is suggested to increase performance of the array, that is, improve the efficiency of the power transmitted, to include an attachment of a staff and elevated sphere illustrated in FIG. 12 or to add the tickler coils 332 illustrated in FIG. 3d utilizing the mobile receiver card 500 illustrated in FIG. 5.

Figure 3C:
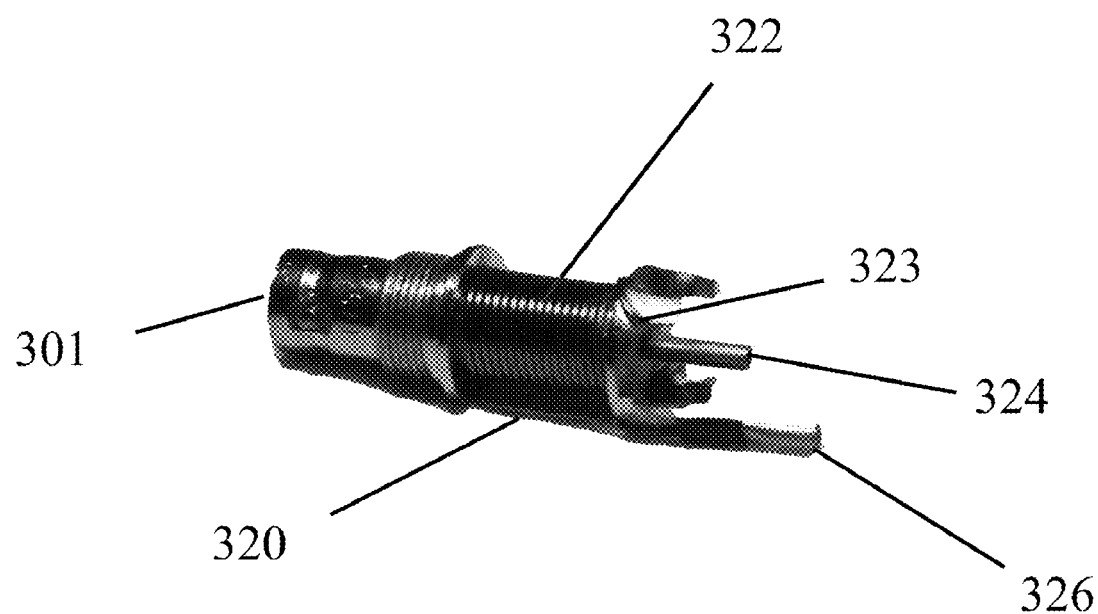
Figure 3D:
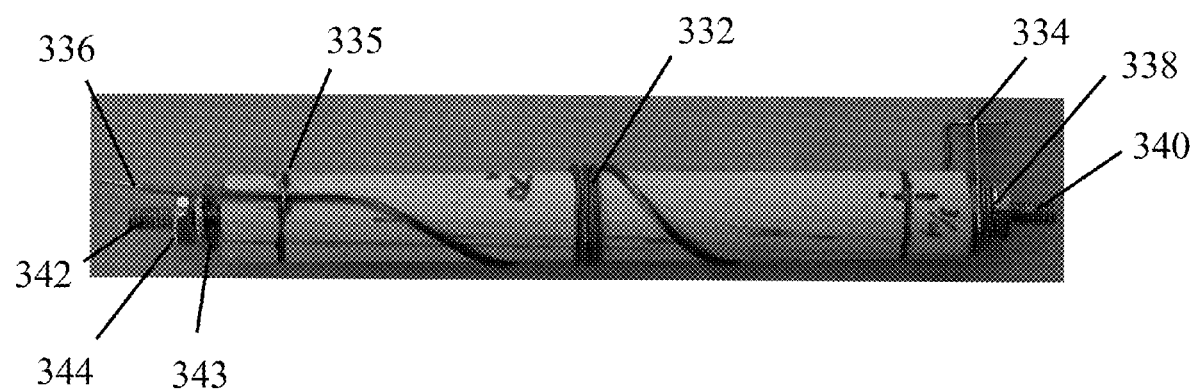

The gap between the common center 306 and bore holes 310 and 311 in the secondary winding 309 is such that it can accept the mount 342 for a tickler coil shown in FIG. 3d for use in the second embodiment of a system of wireless energy of the present invention or the mount for a staff 1201 and elevated sphere 1200 shown in FIG. 12 for use in the sixth embodiment of a system of wireless energy of the present invention. The hole at the common center 306 accepts a threaded mount 335 from tickler coil 332 or the staff 1201 set upright in the z-direction respective to the x-y plane of the pad, bore hole 310 accepts a wire from one end 336 of the tickler coil 332 or from one end 1202 of the staff 1201 with elevated sphere 1200 so that it extends beneath the coil pad connecting to terminal 329. In this example, the radius of the gap is 1 cm but can be more or less depending on the desired resonance frequency, that is, the number of turns that are desired given the particular resonance frequency required as per the specific application but not limited to it.

Referring now to FIG. 3c, there is shown a three-quarters rear-to-front view of the signal shaper 320 used in all six embodiments of a system of transmission of wireless energy of the present invention. The fuselage encapsulating the connection 301 is a Hewlett-Packard part number 1250-1671 but the unit itself is not included in the patent application. It serves as a useable part in the present invention. The unit is not modified, rather, wrapped in the same wire gauge as the secondary coil with the number of turns being 18 to give it the property of a tickler coil stimulating the transfer of the signal to the secondary coil, in essence "warming-up" the transmission circuit. The resistance of the winding 322 slows the velocity of the incoming signal in its low capacity while its maximum component passes through the center of the field creating a differential between each amplitude minimum and maximum in the frequency cycle. One end of the tickler coil 322 connects to a leg on the pinned-end 323 to the other end is nuzzled at the housing just behind the thread-path collar of connection 301, each touch-point enameled insulator is removed from the wire to allow contact between the conductor and the housing. The fuselage has ends for the center and housing, the center and one squared-housing pin are pressed with a piece of tubing 324, 326, in this example brass, each of which are of a sufficient size to allow a snug connection to a matched set of tubes 317, 319 of FIG. 3b connecting the primary coil winding to the source input represented in the BNC-style connection 301. This signal shaper, therefore, allows the incoming signal from the source oscillator or signal generator to be modified in such a manner as already described to be appropriate as a stream of energy, broadcast without wires to distant objects in such fashion and be transformed back into its original sinusoidal components. The fuselage in its present usage can be of another type so long as it allows a coaxial connection, has a length necessary to facilitate the length of winding 322, and a connection, which herein is a BNC-style but is not necessarily limited to it.

Referring now to FIG. 3d, there is shown an overhead view the tickler coil 332 used in the second and fourth embodiments of a system of transmission of wireless energy of the present invention. Separate from the tickler coil 332 is a mount 337 consisting of an insulated circular cylinder of a material such as in this example is wood or plastic but can be of any suitable material so long as it is non-conductive and reasonably solid so as to form a base on which coil 332 can be wound or left empty extending the component to serve as an insulated mount 1201 in the fifth and six embodiments of a system of transmission of wireless energy of the present invention. To the left of the figure is the lower mounting stud 342 constructed, in this example, of stainless steel with a typical stainless steel washer 343 and fastener nut 344. The lower mounting stud 342 serves to attach the mount 337 to the transmitter pad element 300 via the bore hole 306. To the right of the figure is the upper mounting stud 340 constructed, in this example, of stainless steel with a lead connector 334 constructed, in this example, of hobby brass with a fastener nut 338. The upper mounting stud 340 serves to attach the mount 337 to the elevated sphere 1200.

The tickler winding or coil 332 comprises a radiating element in the form of a cylindrical-shaped conductive wire with a rotation about the length of the mount 337 in a clockwise direction whose size, in this example, is AWG 20.5 and attached to 337 by adhesive and clip 335. An enameled conducting material, for example, magnet wire or other suitable conducting medium capable as such, where the number of turns about the mount 337 is approximately 74.75, but can be more or less turns depending on which frequency-to-power ratio is desirable given the application of the mobile card 500 in its particular configuration.

Connection wire 336 passes through bore hole 310 so as to connect with the secondary coil 309 at 329 to provide a direct connection for the signal path. It is not necessary, however, to connect 336 to 329 if it is desirable to absorb the energy from the signal path in the electromagnetic field.

4

Figure 4:
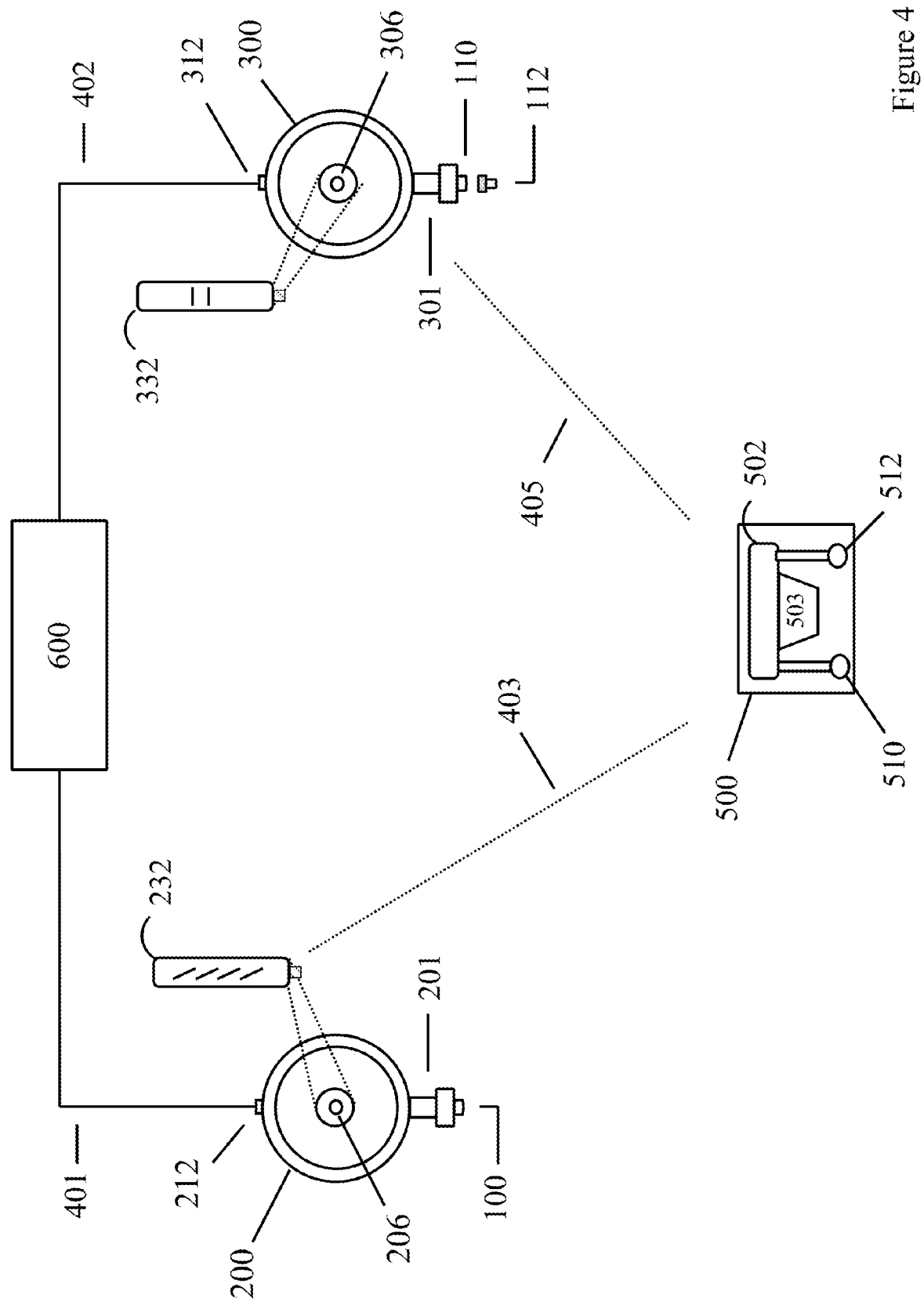
FIG. 4 shows a schematic, top-view of the transmitter and receiver pair with terrestrial capacitor, full tickler coil for the transmitter, scant tickler coil for the receiver, receiver with a stop termination at its output, and a single mobile receiver card in the second and fourth embodiment of a system of transmission of wireless energy of the present invention.

Referring now to FIG. 4 there is shown a second embodiment of a system of transmission of wireless energy of the present invention. This terrestrial configuration of the array comprises a set of six tuned circuits, termed in its composite form an "array", mounted on insulated background media made primarily of plastic called the elevated pad; to the left the transmitter pad and to the right the receiver pad mounted on an x-y plane, called "elements", each with corresponding tickler coils mounted in the z-direction, a terrestrial capacitor 600, and a mobile receiver card 500.

The transmitter pad 200 and tickler coil 232 attached via bore hole 206, to the left of the figure, comprises the transmission aperture power-emitting source of the wireless broadcast signal of the second embodiment of a system of transmission of wireless energy of the present invention.

The receiver pad 300 and tickler coil 332 attached via bore hole 306, to the right of the figure, comprises the reflection of the wireless broadcast signal to be absorbed at the mobile receiver card 500 of the second and fourth embodiments of a system of transmission of wireless energy of the present invention.

The mobile receiver 500 and receiving coil 502, radio-frequency conversion circuit 503, and polarized exit leads 510 and 513, at the bottom of the figure, comprises the mobile receiving element of the wireless broadcast signal of the second and fourth embodiments of a system of transmission of wireless energy of the present invention.

The elements may be constructed of any suitable conducting material including, by way of example, wound wire, patterns etched on a PC board, and sprayed conducting material on an insulating background. The coils are non-ferrous core and can be constructed of any suitable non-conductive material.

The signal flow represented in the schematic pattern of the first embodiment of a system of transmission of wireless energy of the present invention is: a system whose desirable operating properties are capable of transmitting an external radio-frequency signal in the form of a piece of equipment as hardware or software 100 of a preferred range 40 to 400 MHz but not limited necessarily to this range, connected to a matched-Impedance terminal with a typical BNC female fitting 201 receives this input signal introducing it to the primary coil 203 where it is transferred to the secondary coil 209 then to the tickler coil 232 where the stored energy in the form of power in 209 is transferred away from 309 to a remote location away from the x-y plane to be collected at the mobile receiver card coil 502.

Figure 5:
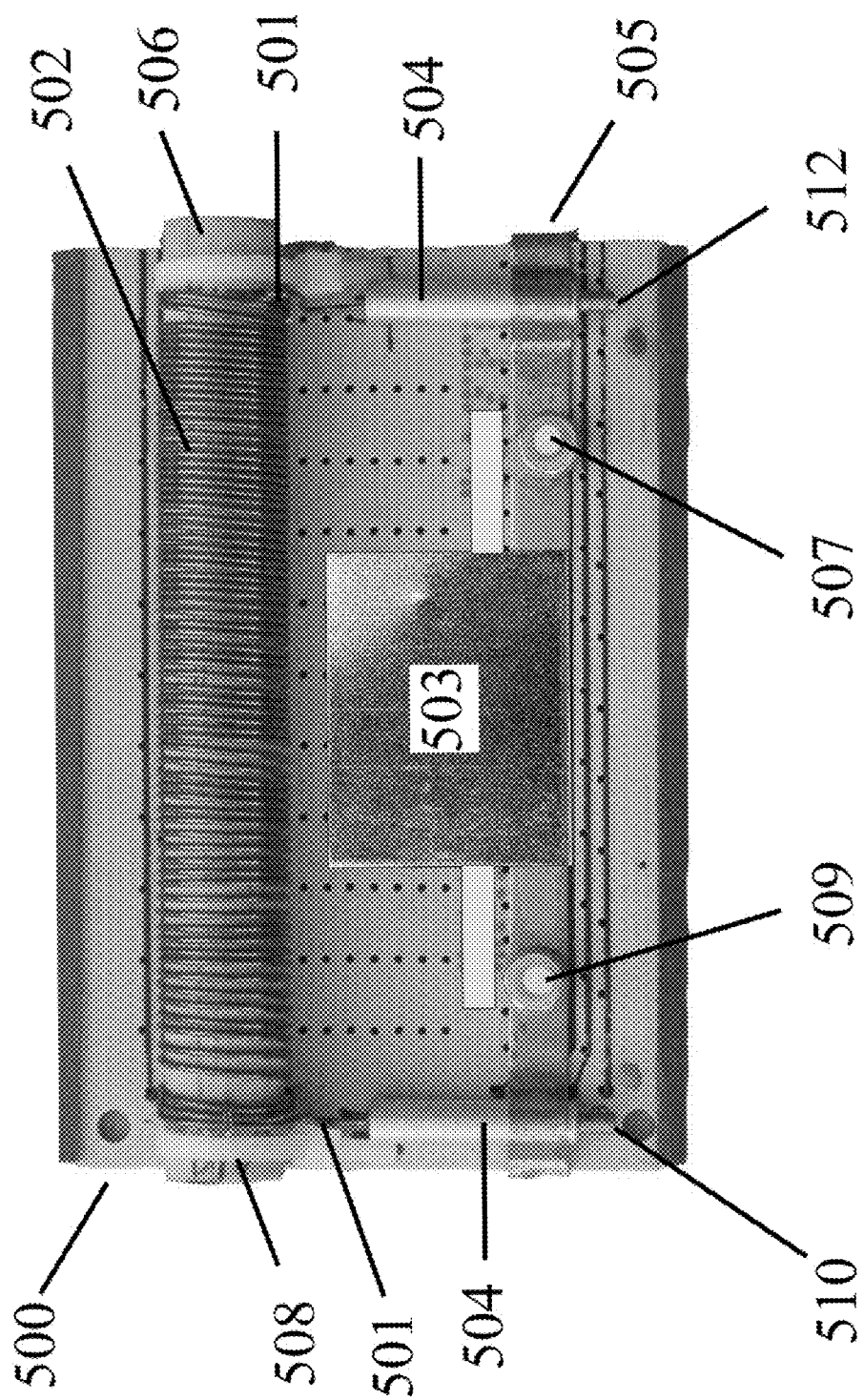
FIG. 5 shows a drawing, top-view, of the mobile receiver card with its conversion circuitry box of the second embodiment of a system of transmission of wireless energy of the present invention.

The pattern of the winding of the linear coil 232, that is, in a clockwise direction, is directionally opposite and tuned to 502 of FIG. 5 where the energy input to the system by the external sinusoidal generator at 100 is received, the wave decompiled to a form of direct current, and such power made available to a commonplace device at connection terminals positive 504 and negative 506 although the polarity of these terminals can be reversed depending upon the desired application.

The input signal is coupled to the electromagnetic field object manifest as a consequence of the peculiarity of the circuit symmetry, that is, as a geodesic isomorphism, demonstrated here in the second embodiment of a system of transmission of wireless energy of the present invention. The field object acts as a cavity resonator where a signal traveling within its corridors specified by the harmonics illustrated in FIG. 1*a* is transported through the structure because of the high degree of internal reflection of the structure of the electromagnetic field object. The corridor, defined by the spectral pattern, consists of polarized apertures at each end of the circuit consistent with the academic concept of isomorphism, is redirected from its output at 110 by the placement of a stop termination 112 at 301, to the mobile receiver card 500 whose resonant conductive path is established by the relationship of coils 232, 332, and 502 in the circuit. In the manner of transmission of the second embodiment of a system of transmission of wireless energy, the second embodiment in exactly the same manner but with a different architecture allows an efficient transit of the externally-stimulated signal. At resonance, the corridor allows an efficient transit of the externally-stimulated signal both in magnitude and modulation which could be amplitude modulation (AM), frequency modulation (FM), pulse modulation, and/or a combination of these.

In this arrangement there are two distinct broadcast modes: firstly, the signal from the source 100 is broadcast across two-thirds of the tuned circuits $L_1C_1$ given by the pair of circuits 203, 209 of 200 and $L_2C_2$ given by the pair of tuned circuits 303, 309 of 300 where the difference in the equality of the values of $L_1C_1$ and $L_2C_2$ are minimal forming a conductive path at resonance. Secondly, the conduit formed by this conductive path, the field object is extended to include a further set of tuned circuits $L_3C_3$ forming the last one-third where the state of the wave is broadcast from the terrestrial components 200, 300, 600 to the mobile component 500, as a function of the relationship of coils 232, 332, and 502. Under such a system represented in the second embodiment of a system of transmission of wireless energy of the present invention, the energy contained in the field object including and information carried is available at terminals 510 and 512 of the mobile receiver 500.

The term 'mobility' in respect to the second and fourth embodiments of a system of transmission of wireless energy of the present invention refers to the 'compactness' of the mobile receiver card 500 contrasted to the size of the receiver pad element 300 with its tickler coil 332. The purpose of the construction of component 500 is to be fit, in this example, into a battery compartment of an autonomous robot such as i-Cybie (U.S. Pat. No. 6,620,024). The application of the terminals 510 and 512 to provide power to perform work in the arrangement is not limited to consumer or specialized robotics but can be extended to numerous types of autonomous and dependent machines requiring the wireless distribution of energy and information at desirable levels.

The energy dispersed by the second embodiment of a system of transmission of wireless energy of the present invention is dependent upon the signaling capacity of the input source 100 and any accompanying amplification schemes present. The array fulfills the primary purpose of coupling signal and energy from an external source to a wireless scheme conformant to modern techniques allowing commonly-available test equipment to be connected wherein the signals can be monitored and measured, the received signal 504 and 506 processed by a remote device, or realized as work in a loaded circuit by an independent machine designed to consume normalized power.

The signal dispersed by the second embodiment of a system of transmission of wireless energy of the present invention is broadcast at one predominant resonance frequency and a collection of sub-resonance and harmonic frequencies at distances suitable for the transmission of wireless power. FIG. 13 shows the performance characteristic of the signal disbursed by the second embodiment of a system of transmission of wireless energy of the present invention.

To allow the energy and information to be broadcast in such a manner, the array represented in the second embodiment of a system of wireless energy transmission of the present invention is modified to include a wired connection 401, in this example a piece of insulated single or multi-strand wire at transmitter pad 200 terminal 212 which connects to terminal 602 or to cable 608 which is of a standardized component called a 'banana cable' one end of the terrestrial capacitor 600. Additionally, a second wired connection 402 at receiver pad 300 terminal 312 which connects to terminal 606 or to cable 609 closing the circuit adding the capacitance in series to the inductance components of the circuit 209 and 309.

The circuit represented by 200, 300, 600 with its wired connections 401 and 402 allows the dispersion of energy at differential distances 403 and 405 where the values of each do not necessarily have to be equal. This means the mobile receiver card package 500 is allowed the freedom of movement in three dimensions: the x-direction, the y-direction, and the z-direction. In such a way, a device with 500 attached has the ability to travel away from the array and work independently of the its placement. This arrangement implies the possibility of many power and information distribution scenarios such as a stationary array 1000 and a single receiver 500 or a stationary array 1000 and a series of mobile cards 1103 shown in FIG. 10. A plot of the receiver power as a function of distance is illustrated in FIG. 13. This plot shows the efficiency of the array given optimal operational parameters.

These and other scenarios are present in this system as long as the criteria that they are designed to be responsive to the resonance frequencies of the apparatus is met. Some possible, but not limited to these, variations are illustrated in FIGS. 1, 9, 10, 11, and 12.

5

Referring now to FIG. 5, there is shown an overhead view of the mobile receiver card 500, its receiver coil 502, signal waveguides 508, 510, signal conversion circuitry 503 fed by differential connections 507 and 509 yielding to converted outputs 504, 506 in the second and fourth embodiment of a system of transmission of wireless energy of the present invention. Separate from the receiver coil 502 is a mount 506 consisting of an insulated circular cylinder of a material such as in this example is wood or plastic but can be of any suitable material so long as it is non-conductive and reasonably solid so as to form a base on which coil 502 can be wound.

The receiver coil 502 comprises a radiating element in the form of a cylindrical-shaped conductive wire with a rotation about the length of the mount 506 in a counter-clockwise direction whose size, in this example, is AWG 20.5 and attached to 506 by adhesive and clips. An enameled conducting material, for example, magnet wire or other suitable conducting medium capable as such, where the number of turns about the mount 506 is approximately 74.75, but can be more or less turns depending on which frequency-to-power ratio is desirable given the application of the mobile card and the windings on the corresponding tickler coil 232. The coil mount 506 with its attached corresponding coil 502 is fixed to the surface of the mobile card by means of, in this example, plastic wrap ties 508 via holes cut into the surface to facilitate them (not shown).

The receiver coil 502 is wound identical in wire type, size, and winding style yet in an opposite direction to its circuit pair, tickler coil 232 mounted on the transmitter pad 200. Circuitry 503 contains commonly-understood AC-DC passive rectification to convert the power for remote powering of miniature devices, for example colonies of robots, by connection to positive 504 and negative 506 terminals although the polarity of these terminals can be reversed depending on the desired application.

Leads 501 at each end of coil 502 are passed to a tubular coaxial sandwich 504 which, in this example, is constructed of a tube of brass insulated and nested inside a tube of aluminum so that they are snug. Leads 501 are crimped to the piece of brass tubing. Differential strip 505 connects to the aluminum piece of tubing and to connectors 507 and 509 allowing the conversion circuitry 503 to rectify the sinusoidal currents into near-direct current analogues at polarized outputs 510 and 512 which are the other end of the brass tubing passing through the sandwich 504.

Compatible lengths of brass are slid into outputs 510 and 512 which connects the near-sinusoidal free energy to the appropriate device desired to be powered. Depending on the size and robustness of the components chosen for 503, a secondary system of conversion circuitry may be required to filter out all the parasitic oscillations from the output signal.

6

Figure 6:
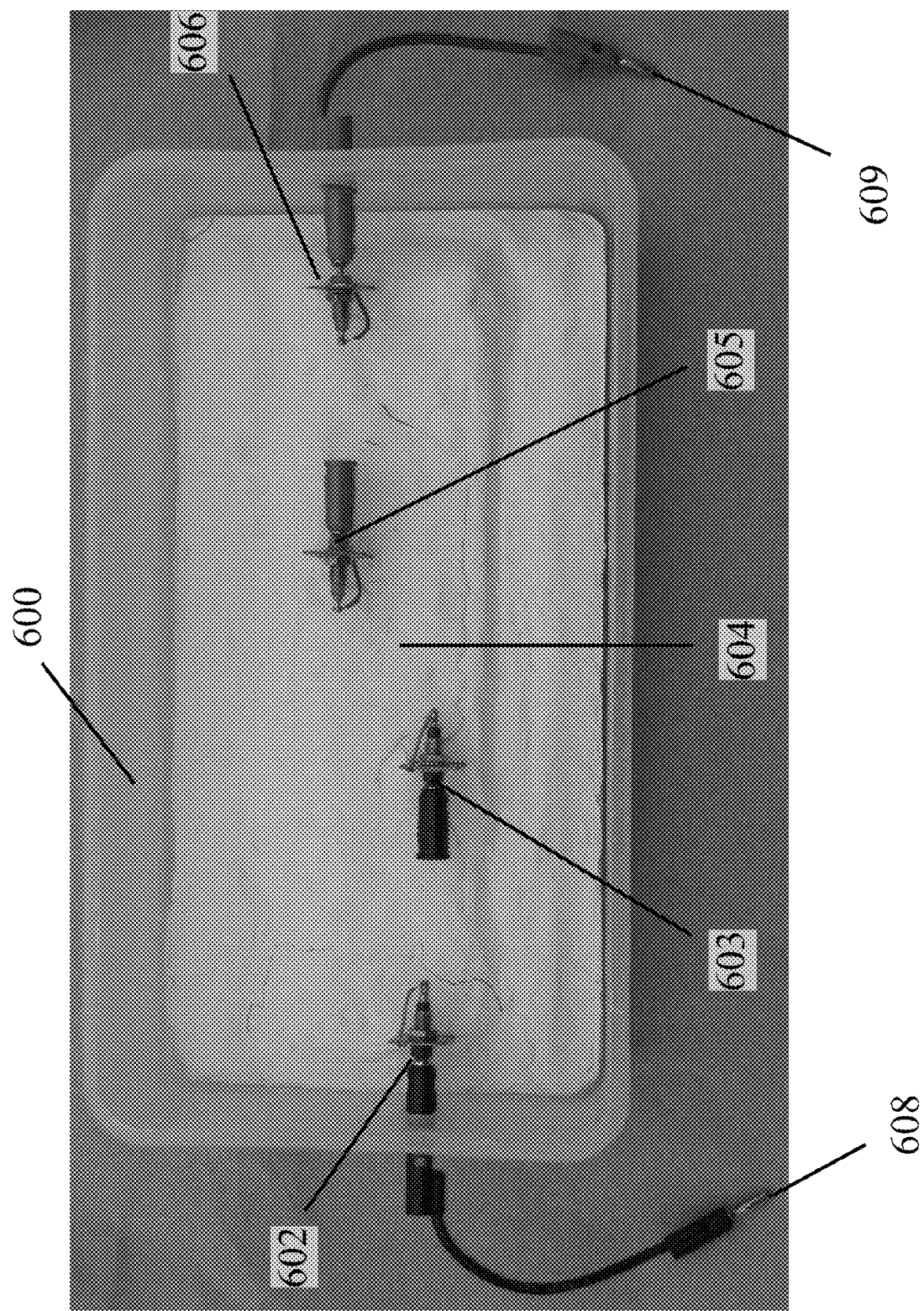
FIG. 6 shows a drawing, top-view, of the terrestrial capacitor with its divisor blades and attached cables of the second and fourth embodiment of a system of transmission of wireless energy of the present invention.

Referring now to FIG. 6, there is shown the dry terrestrial capacitor 600 containing metallic plates sandwiched with dielectric 604, in this example brass and printer paper, encased in model clay and containing two capacitive divisors 603 and 605 to store the energy contained in points in the cycle of the oscillation of the electromagnetic field generated by the structure to maximize its capacity in the second and fourth embodiment of a system of transmission of wireless energy of the present invention. The number of plates in the sandwich 604 are, in this example, 225. The value of capacitance can be added or subtracted by placing the connection cable 608 and 609 to the inputs 602 and 606 to 603 and 605. A multiple series of cables can connect this capacitor to external capacitors either manufactured or homebrewed as long as they conform to standardized 'banana'-type cables 608 and 609 conformant to the terminal size.

7

Figure 7:
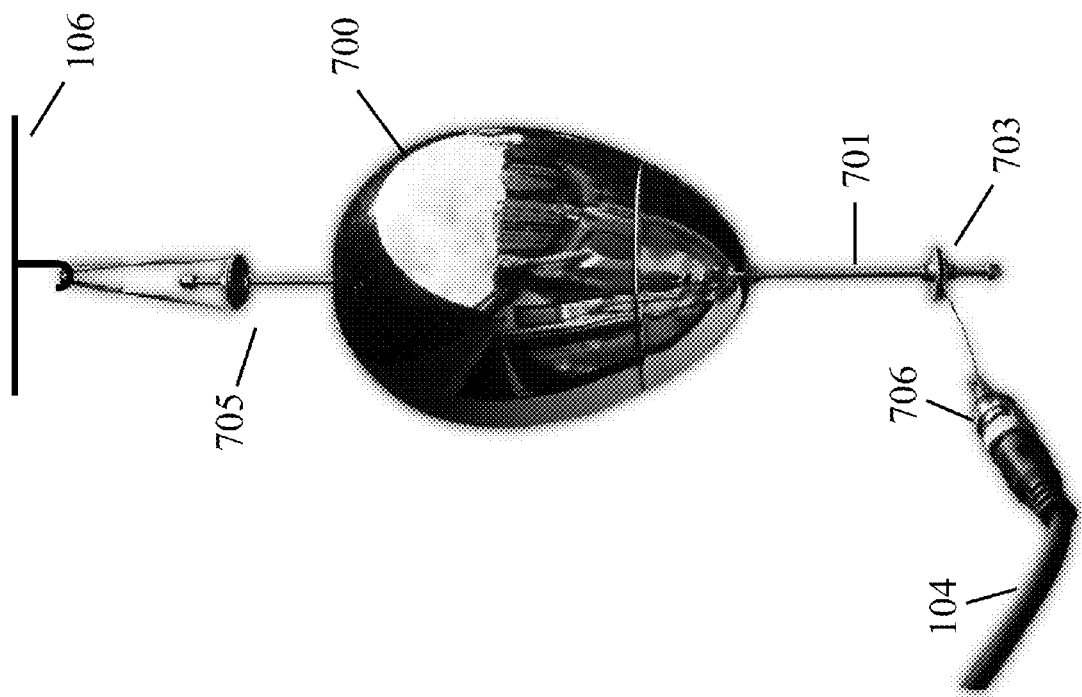
FIG. 7 shows a drawing, front view, of the elevated transmitter aerial with its mounting hook and coaxial cable connection of the first and third embodiment of a system of wireless energy of the present invention.

Referring now to FIG. 7, there is shown an elevated aerial 700 and its composite components threaded mounting fixture 701, upper mounting attachment 705, lower mounting attachment 703, connection 706 mounted to overhead hook 106, and connected to coaxial cable 104 destined for the connection 208 of FIG. 2 in the first and third embodiment of a system of transmission of wireless energy of the present invention.

Threaded mounting fixture 701 is a shaft of finely-cut threads, in this example, stainless steel and of the same radial dimension as mount stud 242. The shell of the elevated aerial 700 can be mounted as it has a bore hole where the shaft passes through it along its longest axis set with an insulated washer between the nut fastener and the housing 700, in this example plastic, fabric, or rubber, to isolate the charge flowing up the shaft from the connection 706 where the electrons form an electromagnetic field which fills the space inside the housing 700.

In order to allow the housing 700 to be mounted overhead 106, a pair of washers large enough to carry the weight of the assembly 700 and the coaxial cable 104 with nut fasteners and lock washers on one-half of 705 compress between a nonconductive ribbon of an appropriate length, in this example 10 centimeters, so the apparatus will hang straight according to the line set by the threaded shaft 701. At the lower mounting attachment 703, a length of conductor, in this example a length of magnet wire of a similar type and size of coils 209, 222, 232 is hooked and compressed in a similar manner as done with 705 to allow a conductive path, the other end soldered to the center pin of a BNC female 706 to allow the connection of the coaxial cable 104 to pass signals between the aerial and the connection 208 of the secondary coil 209 of transmitter pad element 200 of FIG. 2. In this way a value of capacitance is added to the system whose saturation is variable and can store and discharge energy to and from the array in a regular and flexible manner given its frequency sensitivity which, in this example, is between 40 and 400 MHz, though not necessarily limited to this range.

8

Figure 8:
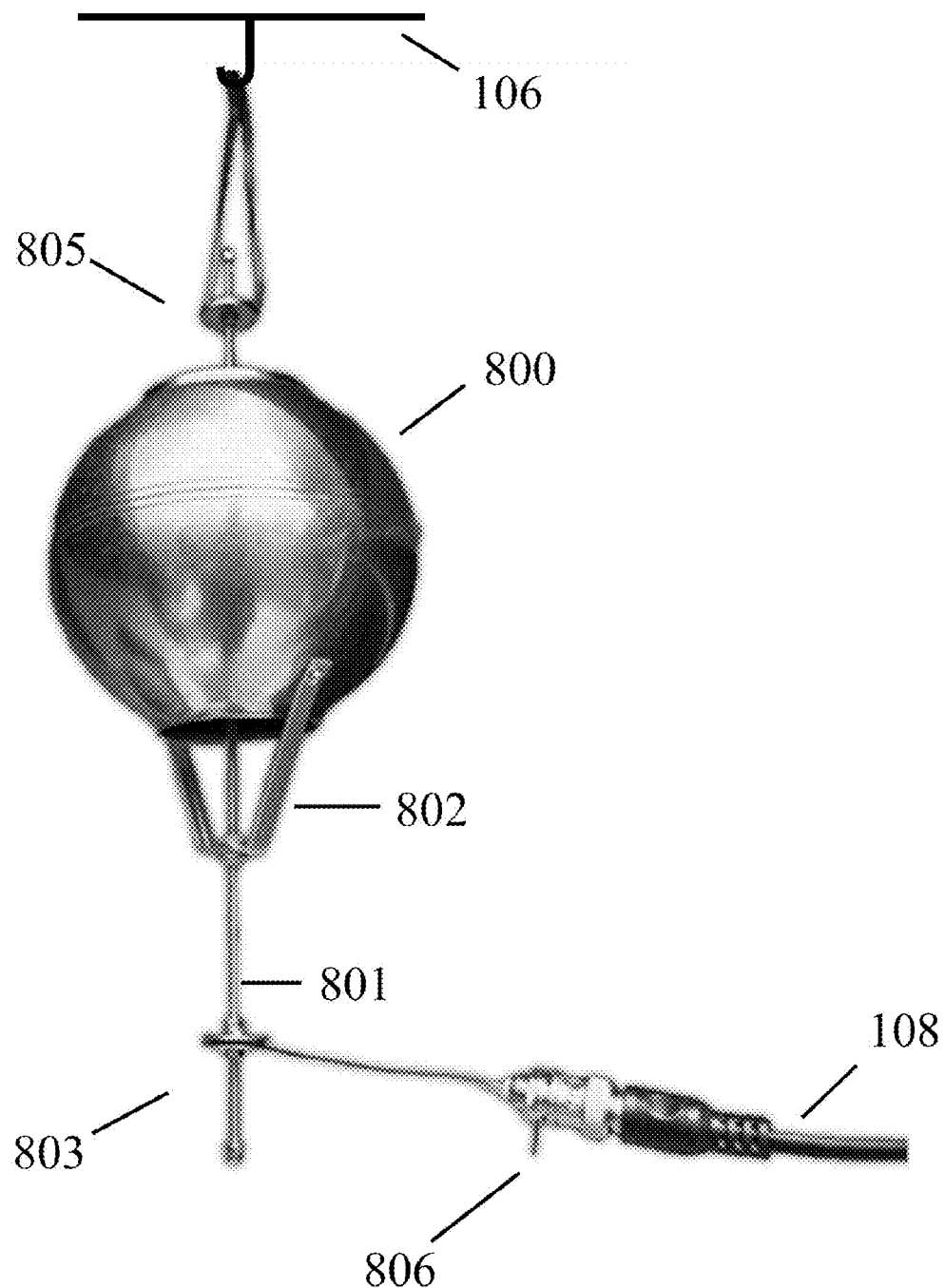
FIG. 8 shows a drawing, front view, of the elevated receiver aerial with its mounting hook and coaxial cable connection of the first and third embodiment of a system of wireless energy of the present invention.

Referring now to FIG. 8, there is shown an elevated aerial 800 and its composite components threaded mounting fixture 801, upper mounting attachment 805, lower mounting attachment 803, connection 806 mounted to overhead hook 106, and connected to coaxial cable 108 destined for the connection 308 of FIG. 3 in the first and third embodiment of a system of transmission of wireless energy of the present invention.

Threaded mounting fixture 801 is a shaft of finely-cut threads, in this example, stainless steel and of the same radial dimension as mount stud 342. The shell of the elevated aerial 800 can be mounted as it has a bore hole where the shaft passes through it along its longest axis set with an insulated washer between the nut fastener and the housing 800, in this example plastic, fabric, or rubber, to isolate the charge flowing up the shaft from the connection 806 where the electrons form an electromagnetic field which fills the space inside the housing 800.

In order to allow the housing 800 to be mounted overhead 106, a pair of washers large enough to carry the weight of the assembly 800 and the coaxial cable 108 with nut fasteners and lock washers on one-half of 805 compress between a nonconductive ribbon of an appropriate length, in this example 10 centimeters, so the apparatus will hang straight according to the line set by the threaded shaft 801. At the lower mounting attachment 803, a length of conductor, in this example a length of magnet wire of a similar type and size of coils 309, 322, 332, and 502 is hooked and compressed in a similar manner as done with 805 to allow a conductive path, the other end soldered to the center pin of a BNC female 806 to allow the connection of the coaxial cable 108 to pass signals between the aerial and the connection 308 of the secondary coil 309 of transmitter pad element 300 of FIG. 2. In this way a value of capacitance is added to the system whose saturation is variable and can store and discharge energy to and from the array in a regular and flexible manner given its frequency sensitivity which, in this example, is between 40 and 400 MHz, though not necessarily limited to this range.

9

Figure 9:
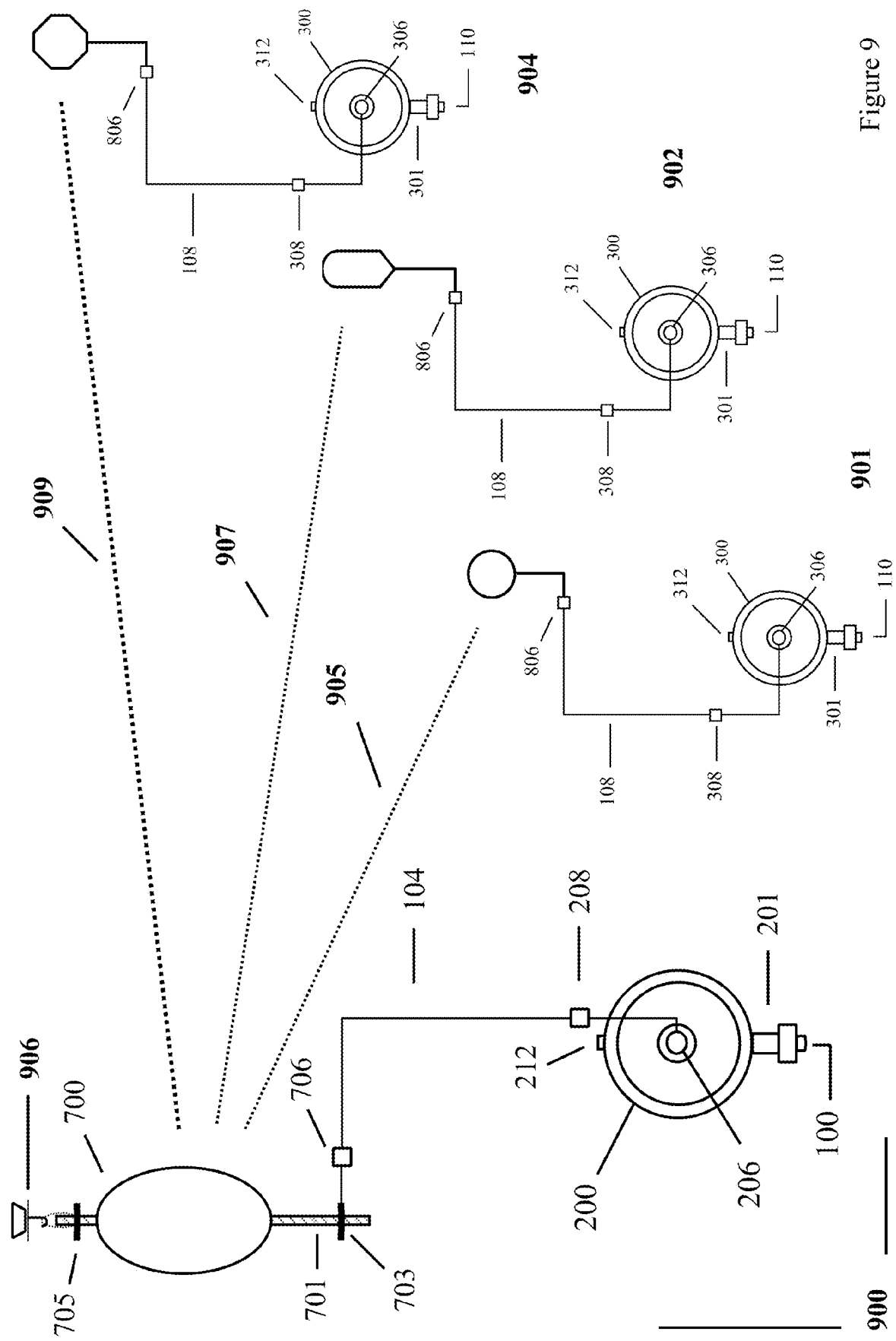
FIG. 9 shows a schematic, top view, of the transmitter with multiple receivers in the third embodiment of a system of transmission of wireless energy of the present invention.

Referring now to FIG. 9, there is shown the third embodiment of a system of transmission of wireless energy of the present invention. This alternate configuration comprises a single transmitter with elevated aerial attached 900 and multiple receiver pads 901, 902, and 904 of a set of distances 905, 907, and 909. The operation of the array in the third embodiment of a system of transmission of wireless energy is identical to that already illustrated in FIG. 1. This arrangement allows the quotient of transmitted power and information to be distributed or shared amongst other fixed or semi-mobile devices capable of manifesting an elevated aerial of differentiable form as illustrated. However, the limitation of this particular application is the area of the aperture of 200 defines the amount of power possible given the arrangement. Therefore, the transmission capacity of the array in this alternate configuration is limited to the sum of the area of apertures of 901, 902, and 904 given the dimensionality of the arrangement.

The energy dispersed by the third embodiment of a system of transmission of wireless energy of the present invention is dependent upon the signaling capacity of the input source 100 and any accompanying amplification schemes present. The array fulfills the primary purpose of coupling signal and energy from an external source to a wireless scheme conformant to modern techniques allowing commonly-available test equipment to be connected wherein the signals can be monitored and measured, the multiple received signals 110 processed by remote devices, or realized as work in a loaded circuit by independent machines designed to consume normalized power.

The signal dispersed by the third embodiment of a system of transmission of wireless energy of the present invention is broadcast at two predominant resonance frequencies and a collection of sub-resonance and harmonic frequencies at distances suitable for the transmission of wireless power. FIG. 13 shows the performance characteristic of the signal disbursed by the third embodiment of a system of transmission of wireless energy of the present invention.

These and other scenarios are present in this system as long as the criteria that they are designed to be responsive to the resonance frequencies of the apparatus is met. Some possible, but not limited to these, variations are illustrated in FIGS. 1, 4, 10, 11, and 12.

10

Figure 10:
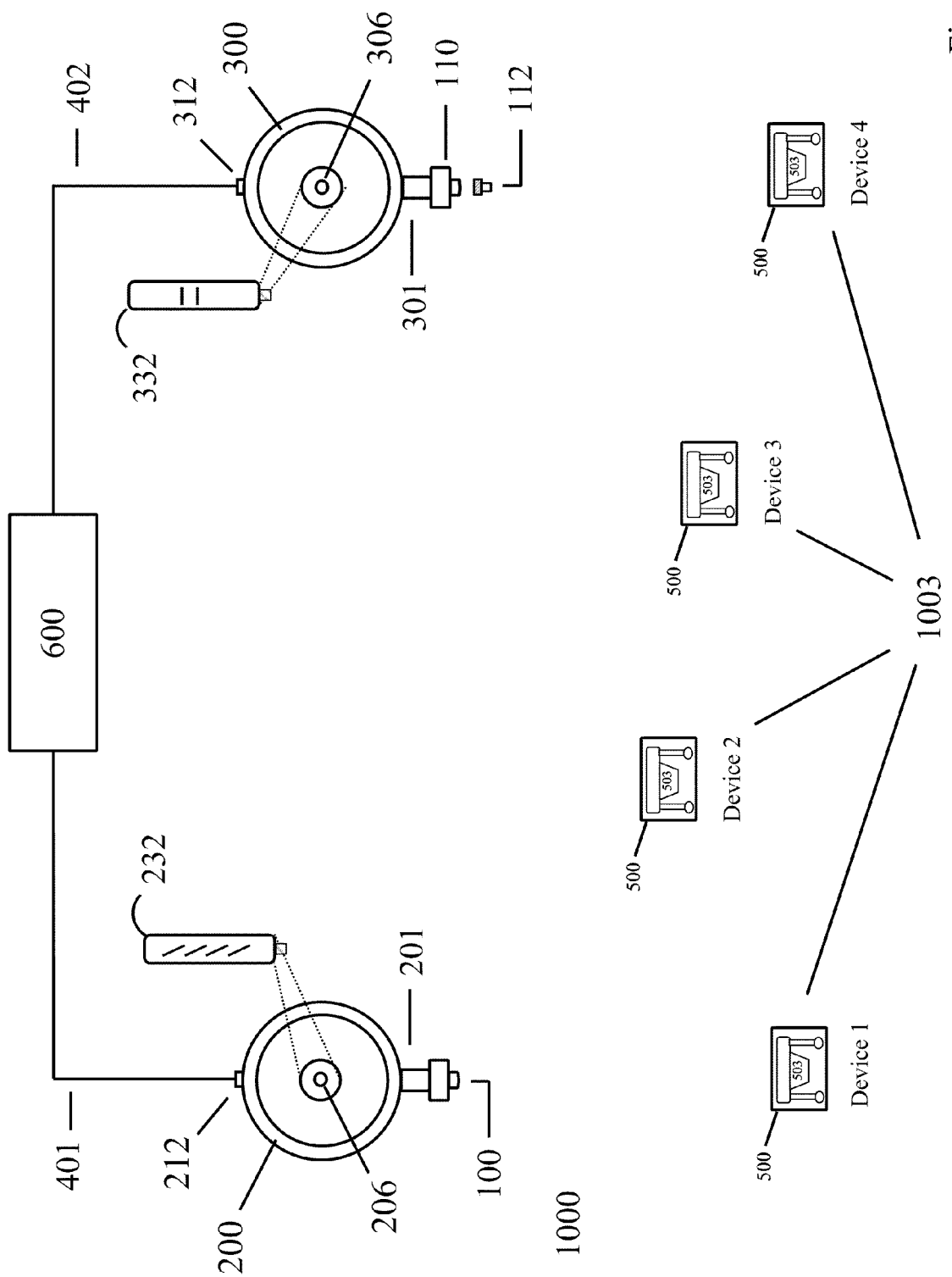
FIG. 10 shows a schematic, top view, of the transmitter and receiver pair with terrestrial capacitor, full tickler coils for the transmitter and receiver, and top loaders mounted to both tickler coils in the fourth embodiment of a system of transmission of wireless energy of the present invention.

Referring now to FIG. 10, there is shown the fourth embodiment of a system of transmission of wireless energy of the present invention. This alternate configuration comprises a single terrestrial transmitter array 1000 containing the transmitter package 200, receiver package 300, terrestrial capacitor 600 and its wired connections 401, 402, and multiple mobile receiver cards 1003.

The array in this configuration is not necessarily limited in its ability to transmit energy by the saturation of apertures, that is, the aperture size limitation imposed by the radius of the primary and secondary coils of the transmitter and the summation of aperture sizes satisfied in the collection of receivers. Instead, the imposed limitation is the carrying capacity as a function of the thickness of wires of the primary and secondary of the transmitter and receiver coils and the ability of the signal source and its amplifier inputting energy into the array. The arrangement is desirable for a single terrestrial transmitter, fixed to a specific geographic set of coordinates to send power and communicate with a series of autonomous machines which, in this example, are primarily for wheeled or legged robots. It is not limited to this, instead, any device that has the capability of its own locomotion and which may or may not require information in the form of instructions for its operation can be deployed under this arrangement.

The energy dispersed by the fourth embodiment of a system of transmission of wireless energy of the present invention is in behavior identical to the other embodiments: dependent upon the signaling capacity of the input source 100 and any accompanying amplification schemes present. The array fulfills the primary purpose of coupling signal and energy from an external source to a wireless scheme conformant to modern techniques allowing commonly-available test equipment to be connected wherein the signals can be monitored and measured, the multiple received signals 1003 processed by remote devices, or realized as work in a loaded circuit by independent machines designed to consume normalized power.

The signal dispersed by the fourth embodiment of a system of transmission of wireless energy of the present invention is broadcast at one predominant resonance frequency and a collection of sub-resonance and harmonic frequencies at distances suitable for the transmission of wireless power. FIG. 13 shows the performance characteristic of the signal disbursed by the fourth embodiment of a system of transmission of wireless energy of the present invention.

These and other scenarios are present in this system as long as the criteria that they are designed to be responsive to the resonance frequencies of the apparatus is met. Some possible, but not limited to these, variations are illustrated in FIGS. 1, 4, 9, 11, and 12.

11

Figure 11:
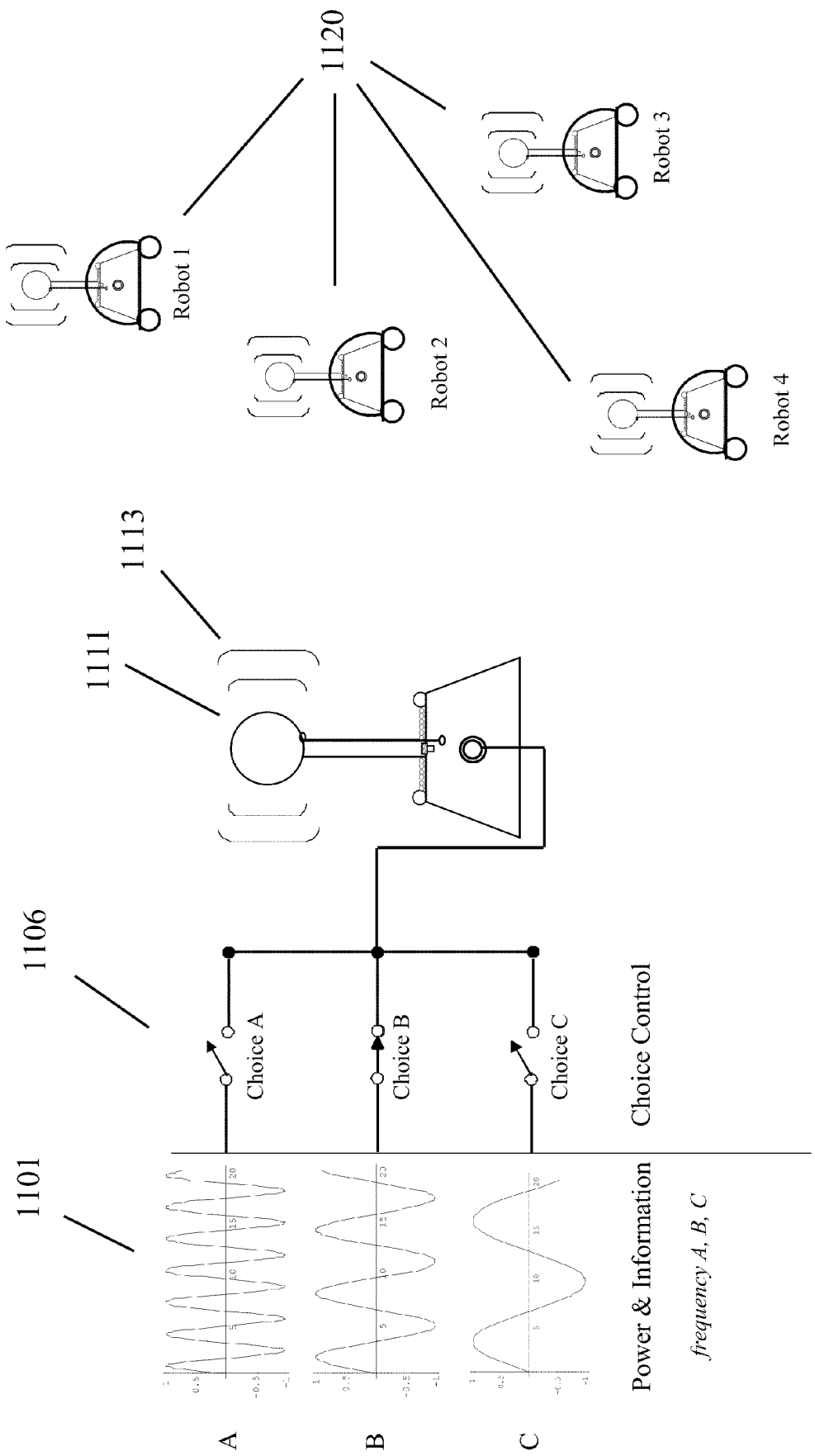
FIG. 11 shows a schematic, front view, of multiple frequency, power, and information transmission through modulation to a matrix of choices to the transmitter sending simultaneous power and data transmission to multiple receiver cards which, in this example, are mounted inside mobile robots in the fifth embodiment of a system of transmission of wireless energy of the present invention.

Referring now to FIG. 11, there is shown the fifth embodiment of a system of transmission of wireless energy of the present invention. This schematic illustrates how energy can be distributed amongst mobile devices, in this instance robots, for optimal advantage. This configuration, called "Featured Power", is an extension of the concept introduced in the fourth embodiment of a system of transmission of wireless energy of the present invention of FIG. 10 where the general application of the mobile receiver card 500 is realized and developed further to include the type of application necessary for a cooperative robotic society represented as a collection of similarly-classed machines. These groups of machines tied to a single transmitter or series of like-designed transmitters consume the energy given by the array and communicate between the transmitter and receiver array in its terrestrial configuration 1000 and appropriately designed hardware 1120 set out in all five embodiments of a system of transmission of wireless energy of the present invention.

The transmitter package 1111 is of the type whose detail is illustrated in FIG. 12. Transmitter 1111 and its radiating signal 1113, is provided by a series of input patters 1101: A, B, and C, through a relay-like system 1106 wherein a choice, made by feedback between 1111 and the power requirements of the devices, in this example robots, 1120. The possible power delivery types are represented on the left side as A, B, and C and by choice types A, B, and C as well. Components 1101 and 1106 in the circuit are designed to make available at least three types of wireless energy to the transmitter for broadcast. The types of wireless energy are available given any multiple of resonance frequencies the array is capable of transmitting, that is according to the description for FIG. 1 in the first embodiment of a system of transmission of wireless energy, the description for FIG. 4 in the second embodiment of a system of transmission of wireless energy, the description for FIG. 9 in the third embodiment of a system of transmission of wireless energy, and the description for FIG. 10 in the fourth embodiment of a system of transmission of wireless energy of the present invention. Each robot represented by 1120 has a receiver element of type 901 with either a suspended aerial using cable 108 or with mount 237 and elevated sphere 1201 of an appropriate relative scale size or can also be tied via a mobile receiver card 500 or of a like-design or using additional tickler coils to step up or down the resonance frequency. In a manner such as this, each robot receives power from anywhere in the grid created by the collection of resonance circuits and communicates with any member attached to a resonance circuit.

The transmitter package 1111 shown in this figure is of the configuration of the sixth embodiment of a system of transmission of wireless energy of the present invention.

The energy dispersed by the fifth embodiment of a system of transmission of wireless energy of the present invention is dependent upon the signaling capacity of the input source 1111, coupling and amplification schemes 1101 and any means of alteration present 1106. The array fulfills the primary purpose of coupling signal and energy from an external source to a wireless scheme conformant to modern techniques allowing commonly-available test equipment to be connected wherein the signals can be monitored and measured, the received signals 1120 processed by remote devices, or realized as work in a loaded circuit by independent machines designed to consume normalized power and affect how such power is distributed by a system of feedback wherein each machine makes a choice as to what type, energy level, density of communication, and others based on the environmental scenarios the machine is programmed to operate in.

The signal dispersed by the fifth embodiment of a system of transmission of wireless energy of the present invention is broadcast at one predominant resonance frequency and a collection of sub-resonance and harmonic frequencies at distances measured in octaves suitable for the transmission of wireless power. FIG. 13 shows the performance characteristic of the signal disbursed by the fifth embodiment of a system of transmission of wireless energy of the present invention.

These and other scenarios are present in this system as long as the criteria that they are designed to be responsive to the resonance frequencies of the apparatus is met. Some possible, but not limited to these, variations are illustrated in FIGS. 1, 4, 9, 10, and 12.

12

Referring now to FIG. 12, there is shown the sixth embodiment of a system of transmission of wireless energy of the present invention. This system comprises a set of four tuned circuits in exactly the same manner as FIG. 1: termed in its composite form an "array", mounted on insulated background media made primarily of plastic called the elevated pad; to the left the transmitter pad element and to the right the receiver pad element mounted on an x-y plane, and two elevated capacities consisting a spherical shape 1200 and 1204 each mounted on a staff 1201 and 1205 connected to a length of wire 1202 of whose size and type is the same as the secondary coils 209 and 309.

The transmitter pad, to the left of the figure, comprises the transmission aperture source of the wireless broadcast signal of the first and third embodiment of a system of transmission of wireless energy of the present invention, contains two elements wound in a pattern of an outward radiating spiral and as illustrated in FIG. 2.

The receiver pad, to the right of the figure, comprises the aperture sink of the wireless broadcast signal of the first and third embodiment of a system of transmission of wireless energy of the present invention, contains two elements wound in a pattern of an outward radiating spiral as illustrated in FIG. 3.

The amplitude of the input signal is split across terminal 201 in FIG. 12. Along this primary coil oscillates the sinusoidal components transferred to the secondary coil 209 by the commonly-understood concept first detailed by Michael Faraday concerning near-field induction. By the relationship of the coupling between the primary and secondary coils 203 and 207 at a suitable rate of Q, the properties including any harmonics in the stimulus frequency and its energy are discharged to the electromagnetic field object by the action at the capacitance stored in the elevated spheres, forming a complete LC circuit at one of several resonance frequencies, each with their own properties, or channels, and degrees of internal reflection.

For the purposes of the arrangement illustrated in FIG. 12, the resonance frequency of the sixth embodiment of a system of transmission of wireless energy in the present invention is 53 MHz or possessing a wavelength of 5.6565 meters.

With an insulated staff comprising threaded bolts in the manner of 242 containing washer 243 and nut-fastener 244 to secure the base of the staff through hole 206 tightened so that it is secured to the bottom surface. The elevated sphere 1200 and 1204 are attached to the staff by means of a threaded stud 240 and 340 respectively and connected to the wire 1202 and 1206 by means of 1203 and 1209.

The signal dispersed by the sixth embodiment of a system of transmission of wireless energy of the present invention is broadcast at one predominant resonance frequency and a collection of sub-resonance and harmonic frequencies at distances suitable for the transmission of wireless power. FIG. 13 shows the performance characteristic of the signal disbursed by the sixth embodiment of a system of transmission of wireless energy of the present invention.

These and other scenarios are present in this system as long as the criteria that they are designed to be responsive to the resonance frequencies of the apparatus is met. Some possible, but not limited to these, variations are illustrated in FIGS. 1, 4, 9, 10, and 11.

13

Referring now to FIG. 13, here is shown a mathematical representation of the effectiveness of the transmission system to perform work all six embodiments of a system of transmission of wireless energy of the present invention.

Referring now to FIG. 13, here is shown a corridor of maximal output power available at 110 relative to the input of an external source such as a sinusoidal generator at 100. The performance factor of the scheme of a system of transmission of wireless energy of the present invention of all six embodiments, that is, the efficiency is defined as the amount of power received to power dissipated in transit, is dependent upon intensity being at maximum. It is measured by dividing the amount of power received by that which is transmitted yielding a dimensionless number $\eta_e$. Represented as an equation:

$$\eta_e = \frac{P_{receiver}}{P_{transmitter}} \quad \text{(Equation 1)}$$

Plotted, the efficiency $\eta_e$ of a system of transmission of wireless energy of the present invention of all six embodiments as a function of distance separated between the transmitting element 200 and the receiving element 300, as measured from the center of the elevated pad, 206 and 306 respectively, at arbitrary values is illustrated as circles on a linear-decaying line marking the distances and the measured efficiency. The y-axis of FIG. 13 represents the factor of efficiency on a scale from 0 to 1 and based on percentage. The x-axis of FIG. 13 represents the distance in centimeters.

In respect to FIG. 13, the display of information of the scheme includes data regarding the efficiency of the energy transferred across the distance between elevated aerials 700 and 800 and the input stimulus frequency given by the RF oscillator 100.

There is shown a plot of the efficiency of the energy transferred across the distance between terrestrial transmission mode, the collection represented by transmitter, capacitor, and receiver components broadcasting to the mobile receiver card.

There is shown a plot of the efficiency of the energy transferred across the distance between transmitter pad with tickler coil and top loader and receiver pad with sparse tickler coil and top loader. The curve shown is a differential between power input by the source and the quantity measured at the receiver output at matched impendence swept across frequency spectrum at the optimal operating frequency of the array.

The information shown in FIG. 13 corresponds to the illustrated scenarios present in this system of transmission of wireless energy of the present invention as long as the components 200, 300, 500, 600, 700, 800, the combinations of 900, 1000, and 1111 are designed to be responsive to the resonance frequencies of the particular configuration required. Some possible, but not limited to these, variations are illustrated in FIGS. 1, 4, 9, 10, 11, and 12.

What is claimed is:

1. A system for the transmission of wireless energy in the form of electrical currents and potential energy utilizing a resonator cavity in the form of an electromagnetic field; an array comprising:

an elevated transmission pad (Tx), comprising a pair of wire loops that do not overlap, one that is thick with rubber insulation, one thinner with enamel insulation wound in a counter-clockwise spiral pattern with a gap in the center for mounting a conducting wire, a third coil or a staff on the plane formed by the pad, comprising a primary-secondary pair whose primary is of only a few turns with an input terminal connection mounted into the elevated pad for an external source such as an oscillator or signal generator with a BNC-type terminal across both ends of the primary wire; and, whose secondary is wound one arm to the next without gaps and of many turns with one end to an output terminal for an external capacitor and the other available as an electrical connection to the object that is mounted in the gap in the center of the composite coil; and, whose input BNC-type terminal's shell is wound from rear to front with the same type of wire as the secondary, one end connected to the shell of the terminal, the other returning along the length of the winding to one end of the primary wire;

an elevated receiver pad (Rx), comprised of a pair of wire loops that do not overlap, one that is thick with rubber insulation, one thinner with enamel insulation wound in a clockwise spiral pattern with a gap in the center for mounting a conducting wire, a third coil or a staff on the plane formed by the pad, comprising a primary-secondary pair whose primary is of only a few turns with an output BNC-type connection to deliver the energy in the form of electrical currents with a BNC-type terminal across both ends of the primary wire; and, whose secondary is wound one arm to the next without gaps and of many turns with one end to an output terminal for an external capacitor and the other available as an electrical connection to the object that is mounted in the gap in the center of the composite coil; and, whose output BNC-type terminal's shell is wound from rear to front with the same type of wire as the secondary, one end connected to the shell of the terminal, the other returning along the length of the winding to one end of the primary wire, using a T-style connection with a stop termination to match impedance across the array at the BNC terminal;

the external source using an amplifier of a suitable frequency range;

a transmitter capacity, elevated approximately 2 meters, of a smooth regular shape, hollow and of metallic manufacture with good conductivity, the shape being an ellipsoid joined at the equator sharing a principal axis of symmetry (egg-shaped) with a threaded bar passing through its longest axis where a hanger is created above, a BNC-type connection below;

a receiver capacity, elevated approximately 2 meters, of a less-smooth regular shape, of metallic manufacture of reasonable conductivity, the shape being a sphere with a threaded bar passing through its center axis where a hanger is created above, a BNC-type connection below; and, a pair of connections from each capacity to their respective pad connected between each pairs' BNC-type connection with an appropriate length of 50 Ohm cable;

a tickler coil mounted in the gap of the transmitter elevated pad, which can be of a ferrous or non-ferrous core, wound clockwise along its length from bottom to top in the z-axis with respect to the plane of the elevated pad with enameled wire of the same size and type as the secondary winding, wound without gaps along the length;

a tickler coil mounted in the gap of the receiver elevated pad, which can be of a ferrous or non-ferrous core, wound along its length in the z-axis with respect to the plane of the elevated pad with enameled wire of the same size and type as the secondary winding, wound sparsely and only of a few turns along the length; and, a mobile receiver card (Rx') consisting of a coil mounted on a flat board and separate from the array, tapped for a connection at each end, wound counter-clockwise from left to right with the same size, type, and number of windings as the tickler coil on the elevated transmission pad; and, the staff mounted in the gap of the transmitter elevated pad, which is non-ferrous, positioned along its length in the z-axis with respect to the plane of the elevated pad creating a point where an elevated sphere of aluminum is placed to add capacitance to the transmitter coils; and, the staff mounted in the gap of the receiver elevated pad, which is non-ferrous, positioned along its length in the z-axis with respect to the plane of the elevated pad creating a point where an elevated sphere of aluminum is placed to add capacitance to the receiver coils; and, comprising a resonant system with four to six of the tuned circuits, whose energy is exchanged in electrical currents transported across the field object formed in the coil arrangement between the tuned circuits of Tx and Rx in the form of a rotating sinusoidal wave and whose surface forms a standing wave pattern as a consequence of the resonator cavity formed by the tuned circuits.

2. A system for the transmission of wireless energy in the form of electrical currents as provided in claim 1, where the mobile receiver card (Rx') is comprised of output taps consisting of two sets of tubes, one smaller and set inside the other, insulated from contact between them, and made of paramagnetic materials such as brass and aluminum.

3. The system according to claim 2, where multiple receivers employing the tickler coil can be arranged such that the winding pattern and number of turns of the mobile coils is the same.

4. The system according to claim 3, where multiple receivers employing the tickler coil can be devised to operate mobile devices including wheeled and leg-jointed robots.

5. The system according to claim 3, where multiple receivers employing the ticker coil can be devised to operate on remote devices including repeater beacons.

6. The system according to claim 5, where multiple receivers can extend the broadcast range of the array by using repeaters.

7. A system for the transmission of wireless energy in the form of electrical currents as provided in claim 1, where the energy can be transported from transmitter (Tx) to receiver (Rx), the energy at receiver (Rx) to power devices consisting of a charging pad or miniature devices.

8. The system according to claim 7, where the device consuming the power is fixed or partially mobile and draws down electrical currents from the array with a matched-impedance load so that current can be drawn smoothly across the transmission facilitating linearly-rising power based upon its load.

9. A system for the transmission of wireless energy in the form of electrical currents as provided in claim 1, where the energy can be transported from transmitter (Tx) to mobile receiver (Rx'), available at the connection taps at each end of the coil.

10. The system according to claim 9, where the device consuming the power is mobile and whose distance from the array necessitates a stepped load so that current can be drawn smoothly across the transmission facilitating linearly-rising power.

11. A system for the transmission of wireless energy in the form of electrical currents as provided in claim 1, where the number of turns constituting the windings of the resonant transmission and receiving circuits of the primary is 1.85 and the number of turns of the secondary is 40.25.

12. A system for the transmission of wireless energy in the form of electrical currents as provided in claim 1, where the number of turns of winding constituting the third coil mounted in the gap of the elevated transmission pad is 74.75.

13. The system according to claim 1, where the number of turns of wire constituting the BNC shell mounted into the elevated pad and serving as the input (Tx) and output (Rx) is 18.

14. The system according to claim 1, where multiple receivers employing the flat spiral can be arranged such that the winding pattern and number of turns of the receivers is kept identical to the elevated receiving pad.

15. The system according to claim 14, where the radius of the coil is smaller than the elevated receiving pad.

16. The system according to claim 1, whose quotient of transmission energy is dependent upon the type of energy inputted to the Tx elevated pad.

17. The system according to claim 1, broadcasting a constant wave in a frequency-response range of 1 MHz to 100 MHz, including a signal capacity that extends into lower or higher ranges.

18. The system according to claim 1, whose transmission broadcast waveform is suitable for modulation by an information-bearing signal input at elevated pad Tx.

19. The system according to claim 18, whose transmission signal, as a measure of frequency serves as a carrier for amplitude, frequency, and pulse modulation—AM, FM, and PM respectively, where the AM and FM signals are used to transport information in the same instance as the transmission signal, and where the PM signals are used to echo the presence of receivers to the transmission system.

20. The system according to claim 19, whose transmission signal as a measure of frequency serves as a carrier for amplitude and frequency modulation, and whose transmission signal has a bandwidth at a great enough rate to facilitate communication and power at a distance.

21. The system according to claim 19, whose transmission signal is a composite of all modulation schemes and power is delivered simultaneously.

22. A system for the transmission of wireless energy in the form of electrical currents as provided in claim 1, whose mutual self-inductance gives rise to a self-adjusting efficiency given the array is operating at resonance.

23. The system according to claim 22, whose waveform is uniform, unmodulated emission transmitting energy in the form of electrical currents.

24. The system according to claim 1, forming a closed transmission environment exchanging energy between transmitter and receiver forming a pair of resonance objects.

25. The system according to claim 24, whose resonance objects are coupled in a rotating medium based on the motion of the charges through the spiral coil while their waves travel in media, including air or a dense gas, forming a wave-guide resonator structure whose properties include total internal reflection at its boundaries.

26. The system according to claim 24, whose resonance objects couple tightly and with minimal leakage, containing a high value of Q when power demand is high, while rejecting other potential resonance objects.

* * * * *